US012657505B2

(12) United States Patent
Thompson et al.

(10) Patent No.: US 12,657,505 B2
(45) Date of Patent: Jun. 16, 2026

(54) EFFICIENT QUANTUM ERROR CORRECTION IN NEUTRAL ATOMS BY CONVERSION TO ERASURE ERRORS

(71) Applicants: The Trustees of Princeton University, Princeton, NJ (US); Wisconsin Alumni Research Foundation, Madison, WI (US)

(72) Inventors: Jeffrey Thompson, Princeton, NJ (US); Shimon Kolkowitz, Madison, WI (US)

(73) Assignees: THE TRUSTEES OF PRINCETON UNIVERSITY, Princeton, NJ (US); WISCONSIN ALUMNI RESEARCH FOUNDATION, Madison, WI (US)

( * ) Notice: Subject to any disclaimer, the term of this patent is extended or adjusted under 35 U.S.C. 154(b) by 50 days.

(21) Appl. No.: 18/724,850

(22) PCT Filed: Jan. 3, 2023

(86) PCT No.: PCT/US2023/010045
§ 371 (c)(1),
(2) Date: Jun. 27, 2024

(87) PCT Pub. No.: WO2023/130114
PCT Pub. Date: Jul. 6, 2023

(65) Prior Publication Data
US 2025/0165843 A1     May 22, 2025

Related U.S. Application Data

(60) Provisional application No. 63/296,080, filed on Jan. 3, 2022.

(51) Int. Cl.
*G06N 10/70*     (2022.01)
*G06N 10/40*     (2022.01)

(52) U.S. Cl.
CPC ............. *G06N 10/70* (2022.01); *G06N 10/40* (2022.01)

(58) Field of Classification Search
CPC .... G06N 10/70; G06N 10/40; G06F 2201/81; G06F 11/004; G06F 11/0763; G06F 11/0793
(Continued)

(56) References Cited

U.S. PATENT DOCUMENTS

| | | |
|---|---|---|
| 11,748,652 B1 | 9/2023 | Kubica |
| 2016/0112066 A1 | 4/2016 | Ashikhmin |

(Continued)

OTHER PUBLICATIONS

International Search Report and Written Opinion issued in corresponding International Application No. PCT/US2023/010045 dated May 3, 2023, pp. 1-8.

(Continued)

*Primary Examiner* — James C Kerveros
(74) *Attorney, Agent, or Firm* — Carter, DeLuca & Farrell LLP; George Likourezos

(57) ABSTRACT

A method for quantum error correction includes: trapping and/or manipulating an array of qubits that include encoded neutral atoms or ions and forms a computational space; encoding the array of qubits to a state characterized in that an error during at least one of an idling, gate, or other operation results in a respective qubit transition to a disjointed state where that error can be detected without disturbing the qubits remaining in the computational space; performing a syndrome measurement of a quantum error correcting code; identifying the presence and location of an error by detecting the corresponding neutral atom or ion has left the computational space after performing the operation; identifying a logical error in the quantum error correcting code associated with a loss of qubit information based on the identified error location and results of the syndrome mea- (Continued)

surement; and adjusting subsequent computational steps based on the identified logical error.

22 Claims, 12 Drawing Sheets

(58) Field of Classification Search
USPC ........................................................ 714/785
See application file for complete search history.

(56) References Cited

U.S. PATENT DOCUMENTS

| | | | | |
|---|---|---|---|---|
| 2020/0116623 | A1 | 4/2020 | Cooper-Roy | |
| 2020/0334101 | A1* | 10/2020 | Albert | G06F 11/0751 |
| 2021/0124640 | A1* | 4/2021 | Nickerson | G06F 11/10 |
| 2021/0264310 | A1 | 8/2021 | Gottesman | |
| 2021/0383189 | A1* | 12/2021 | Cong | G06N 3/0464 |
| 2022/0198311 | A1* | 6/2022 | Delfosse | G06N 10/70 |
| 2022/0216884 | A1* | 7/2022 | Delfosse | H03M 13/1111 |

OTHER PUBLICATIONS

Cong, I. et al., "Hardware-Efficient, Fault-Tolerant Quantum Computation with Rydberg Atoms" arXiv:2105.13501v1 (May 2021) pp. 1-29.
Madjarov, Y. et al., "High-fidelity entanglement and detection of alkaline-earth Rydberg atoms" arXiv:2001.04455v2 (Nov. 2020) pp. 1-16.
Extended European Search Report issued by the European Patent Office in connection with International Application No. 23735184. 6, dated Oct. 22, 2025.
M. Grassl, et al., "Codes for the Quantum Erasure Channel", Cornell University Library, Oct. 28, 1996, pp. 1-6.
James M. Auger, et al., "A blueprint for fault-tolerant quantum computation with Rydberg atoms", Cornell University Library, Jul. 20, 2017, pp. 1-7.

* cited by examiner

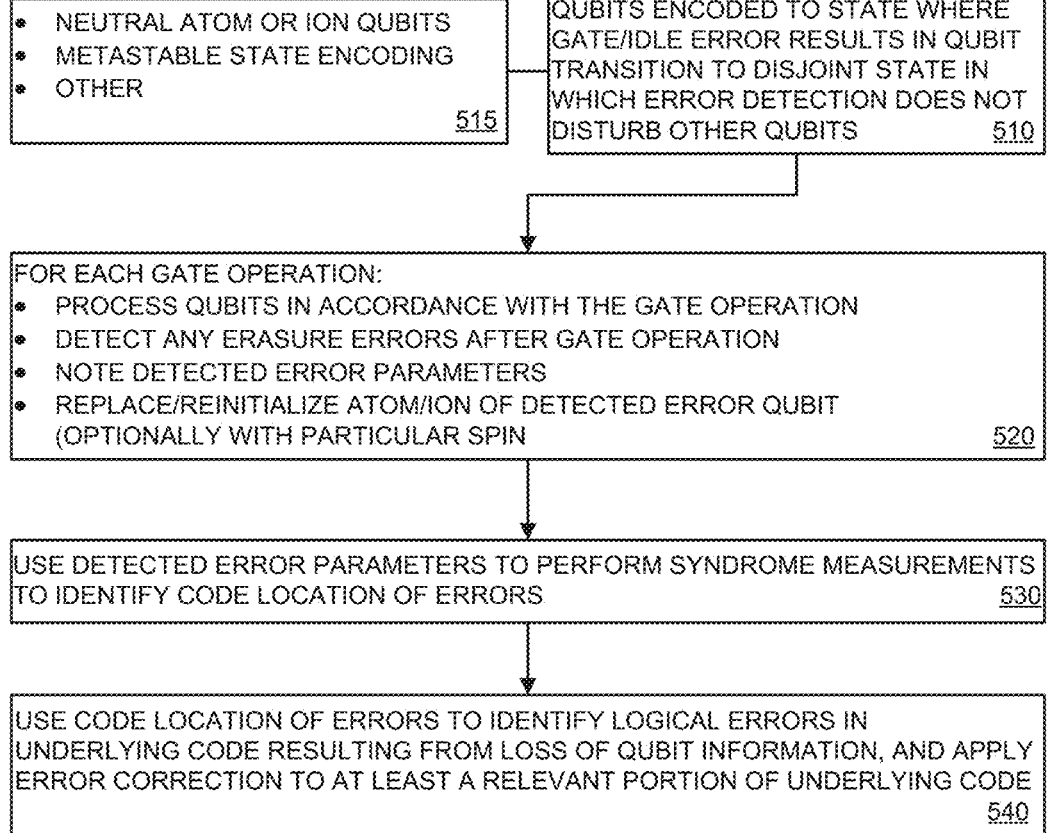

- NEUTRAL ATOM OR ION QUBITS
- METASTABLE STATE ENCODING
- OTHER
  515

QUBITS ENCODED TO STATE WHERE GATE/IDLE ERROR RESULTS IN QUBIT TRANSITION TO DISJOINT STATE IN WHICH ERROR DETECTION DOES NOT DISTURB OTHER QUBITS          510

FOR EACH GATE OPERATION:
- PROCESS QUBITS IN ACCORDANCE WITH THE GATE OPERATION
- DETECT ANY ERASURE ERRORS AFTER GATE OPERATION
- NOTE DETECTED ERROR PARAMETERS
- REPLACE/REINITIALIZE ATOM/ION OF DETECTED ERROR QUBIT (OPTIONALLY WITH PARTICULAR SPIN          520

USE DETECTED ERROR PARAMETERS TO PERFORM SYNDROME MEASUREMENTS TO IDENTIFY CODE LOCATION OF ERRORS          530

USE CODE LOCATION OF ERRORS TO IDENTIFY LOGICAL ERRORS IN UNDERLYING CODE RESULTING FROM LOSS OF QUBIT INFORMATION, AND APPLY ERROR CORRECTION TO AT LEAST A RELEVANT PORTION OF UNDERLYING CODE          540

FIG. 5                    500

EFFICIENT QUANTUM ERROR CORRECTION IN NEUTRAL ATOMS BY CONVERSION TO ERASURE ERRORS

CROSS-REFERENCE TO RELATED APPLICATIONS

This is a National Stage Application under 35 U.S.C. § 371(a) of PCT/US2023/010045, filed on Jan. 3, 2023, which claims the benefit of U.S. Provisional Patent Application Ser. No. 63/296,080 filed Jan. 3, 2022, entitled EFFICIENT QUANTUM ERROR CORRECTION IN NEUTRAL ATOMS BY CONVERSION TO ERASURE ERRORS, which Provisional Patent Application is incorporated herein by reference in its entirety.

GOVERNMENT INTEREST

This invention was made with government support under Grant Nos. W911NF-18-1-0215 and W911NF-21-1-0012 awarded by the Army Research Office (ARO), Grant No. N00014-20-1-2426 awarded by the Office of Naval Research (ONR), Grant No. W911NF-20-1-0021 awarded by the Defense Advanced Research Projects Agency (DARPA-ONISQ), and Grant Nos. OMA-2120757 and 2016136 awarded by the National Science Foundation. The government has certain rights in the invention.

FIELD OF THE DISCLOSURE

The present invention relates to the field of quantum computing and, more particularly, to methods of improving error correction in neutral atom qubits.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Scalable, universal quantum computers have the potential to outperform classical computers for a range of tasks. However, the inherent fragility of quantum states and the finite fidelity of physical qubit operations make errors unavoidable in any quantum computation. Quantum error correction allows multiple physical qubits to represent a single logical qubit, such that the correct logical state can be recovered even in the presence of errors on the underlying physical qubits and gate operations. If the logical qubit operations are implemented in a fault-tolerant manner that prevents the proliferation of correlated errors, the logical error rate can be suppressed arbitrarily so long as the error probability during each operation is below a threshold. Fault-tolerant protocols for error correction and logical qubit manipulation have recently been experimentally demonstrated in several platforms.

The threshold error rate depends on the choice of error correcting code and the nature of the noise in the physical qubit. While many codes have been studied in the context of the abstract model of depolarizing noise arising from the action of random Pauli operators on the qubit, the realistic error model for a given qubit platform is often more complex, which presents both opportunities and challenges. For example, qubits encoded in cat-codes in superconducting resonators can have strongly biased noise, leading to significantly higher thresholds given suitable bias-preserving gate operations for fault-tolerant syndrome extraction. The realization of biased noise models and bias-preserving gates for Rydberg atom arrays has also been discussed. On the other hand, many qubits also exhibit some level of leakage outside of the computational space, which requires extra gates in the form of leakage-reducing units, decreasing the threshold.

Improvements are desired.

SUMMARY

Various deficiencies in the prior art are addressed by systems, methods, mechanisms, apparatus, and improvements thereof providing a method for implementing quantum error correction wherein qubits are encoded using energy or spin levels of, illustratively, a metastable state such that gate errors predominantly result in transitions to disjoint subspaces whose populations can be continuously monitored via fluorescence without disturbing a computational space including other qubits. The various embodiments are configured to convert dominant physical errors into erasure errors, which have a known location and error-affected qubit(s), such that error correction may be used to recover the underlying data associated with error-affected qubits.

A method according to one embodiment comprises providing a plurality of qubits encoded into a plurality of encoding states and forming thereby a computational space, wherein an error during an idling or gate operation results in a respective qubit transition to a disjoint state that can be detected without disturbing the qubits remaining in the computational space, wherein the qubits form a quantum error correcting code and the detected error comprises an erasure error. Each qubit may comprise a neutral atom or ion. The states chosen to encode the qubits may comprise, illustratively, metastable states. The neutral atoms may comprise, illustratively, 171-ytterbium atoms, and the encoding states comprise hyperfine states of $6s6p\ ^3P_0\ F=1/2$ level in $^{171}$Yb. The method may perform gate operations such as by optical coupling to an excited state such as a highly excited Rydberg state.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 5 depicts a flow diagram of a method according to some embodiments;

Figure 1:
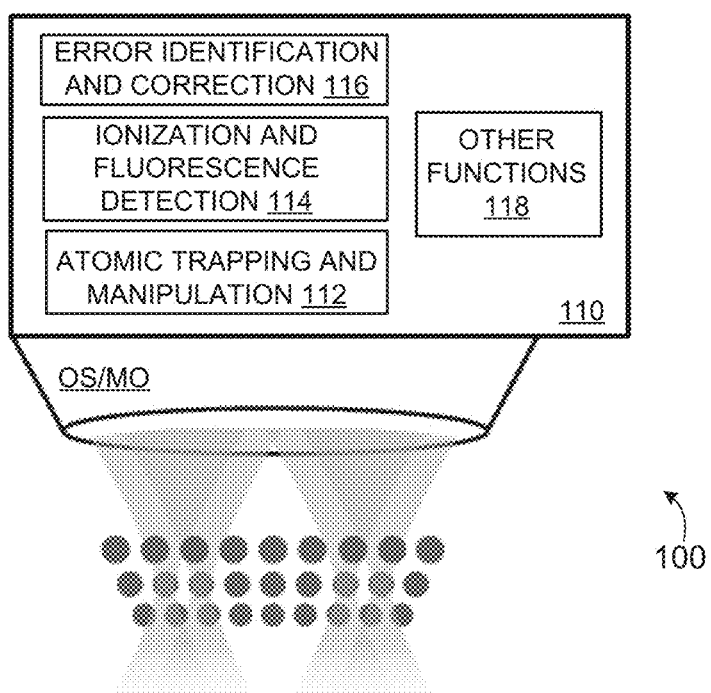
FIG. 1 schematically illustrates a neutral atom quantum computer.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It must be noted that as used herein and in the appended claims, the singular forms "a", "an", and "the" include plural referents unless the context clearly dictates otherwise.

Quantum error correction allows multiple physical qubits to represent a single logical qubit, such that the correct logical state can be recovered even in the presence of errors on the underlying physical qubits and gate operations. If the logical qubit operations are implemented in a fault-tolerant manner that prevents the proliferation of correlated errors, the logical error rate can be suppressed arbitrarily so long as the error probability during each operation is below a threshold. Fault-tolerant protocols for error correction and logical qubit manipulation have recently been experimentally demonstrated in several platforms.

The threshold error rate depends on the choice of error correcting code and the nature of the noise in the physical qubit. While many codes have been studied in the context of the abstract model of depolarizing noise arising from the action of random Pauli operators on the qubit, the realistic error model for a given qubit platform is often more complex, which presents both opportunities and challenges. For example, qubits encoded in cat-codes in superconducting resonators can have strongly biased noise, leading to significantly higher thresholds given suitable bias-preserving gate operations for fault-tolerant syndrome extraction. The realization of biased noise models and bias-preserving gates for Rydberg atom arrays has also been discussed. On the other hand, many qubits also exhibit some level of leakage outside of the computational space, which requires extra gates in the form of leakage-reducing units, decreasing the threshold.

Another type of error is an erasure, or detectable leakage, which denotes an error at a known location. Erasures are significantly easier to correct than depolarizing errors in both classical and quantum settings. For example, a four-qubit quantum code is sufficient to correct a single erasure error, and the surface code threshold under the erasure channel approaches 50% (with perfect syndrome measurements), saturating the bound imposed by the no-cloning theorem. Erasure errors arise naturally in photonic qubits: if a qubit is encoded in the polarization, or path, of a single photon, then the absence of a photon detection signals an erasure, allowing efficient error correction for quantum communication and linear optics quantum computing.

The various embodiments provide qubit encoding and gate protocol for, illustratively, $^{171}$Yb, neutral atom qubits that converts the dominant physical errors into erasures, that is, errors in known locations. Instead of using energy or spin levels of ground state (with nearly infinite coherence), the qubits are encoded using energy or spin levels of metastable state (with relatively long but not infinite coherence times). This qubit encoding with a metastable electronic level such that gate errors predominantly result in transitions to disjoint subspaces whose populations can be continuously monitored via fluorescence. It is estimated that 98% of the dominant physical errors can be converted into erasures. The benefits of the embodiments are verified via circuit-level simulations of the surface code, finding a threshold increase from 0.937% to 4.15%. Also noted is a larger code distance near the threshold, leading to a faster decrease in the logical error rate for the same number of physical qubits, which is important for near-term implementations. Erasure conversion according to the embodiments is applicable to other error correcting codes, and may also be applied to design new gates and encodings in other qubit platforms.

The various embodiments provide an approach to fault-tolerant quantum computing in Rydberg atom arrays based on converting a large fraction of naturally occurring errors into erasures. The various embodiments will be discussed within the context of a physical model of qubits encoded in an exemplary atomic species; namely, $^{171}$Yb, that enables erasure conversion without additional gates or ancilla qubits. By encoding qubits in the hyperfine states of a metastable electronic level, the vast majority of errors (i.e., decays from the Rydberg state that is used to implement two-qubit gates) result in transitions out of the computational subspace into levels whose population can be continuously monitored using cycling transitions that do not disturb the qubit levels. As a result, the location of these errors is revealed, converting them into erasures. It is estimated that a fraction $R_e$=0.98 of all errors can be detected this way.

Second, the benefit of erasure conversion at the circuit level is quantified using simulations of the surface code. It is found that that the predicted level of erasure conversion results in a significantly higher threshold, $p_{th}$=4.15%, compared to the case of pure depolarizing errors ($p_{th}$=0.937%). Finally, a faster reduction in the logical error rate immediately below the threshold is found.

While this disclosure provides a novel motivation to pursue qubits based on Yb and other alkaline earth-like atoms, these atoms have also attracted recent interest thanks to other potential advantages. In particular, long qubit coherence times, narrow-line laser cooling, and rapid single-photon Rydberg excitation from the metastable $^3P_0$ level offer the potential for improved entangling gate fidelities and a suppression of technical noise. It is noted that the highest reported Rydberg entanglement fidelity, F=0.991, was achieved using the analogous metastable state in $^{88}$Sr. The use of a metastable electronic level offers other benefits beyond erasure conversion, including straightforward mid-circuit measurement and array reloading capabilities.

It is also noted that the approach(es) described herein are suitable for use in fault-tolerant computing applications using Rydberg arrays, which are based on realizing highly biased noise and correcting leakage errors with additional ancilla operations. In comparison, the erasure conversion protocol disclosed herein also handles leakage errors, but without requiring additional gates. Additionally, the circuit-level threshold for erasure errors is similar to or higher than that for biased noise, but does not restrict the circuit to bias-preserving gates.

Erasure Conversion in $^{171}$Yb Qubits

FIG. 1 schematically illustrates a neutral atom quantum computer. In a neutral atom quantum computer, an array of atomic qubits are trapped, manipulated, and detected using light projected through various optical systems OS including a microscope objective MO. In particular, the neutral atom quantum computer 100 of FIG. 1 is simplistically represented as including various functions such as atomic trapping and manipulation functions 112, ionization and fluorescence detection functions 114, error identification and correction functions 116, and other functions 118 such as gate operations, gate control operations, logic operations and the like as discussed herein. The various functions may be implemented using equipment appropriate to the various functions discussed herein, wherein such equipment may be controlled via computing machinery including one or more processor(s) coupled to, and adapted to cooperate with, non-transitory memory 534, input/output (I/O) circuitry, communications interfaces, and various support circuitry. In this manner, control of the various functions described herein may be implemented in hardware or a combination of hardware and software, such as discussed in more detail below with respect to the various figures.

Figure 2:
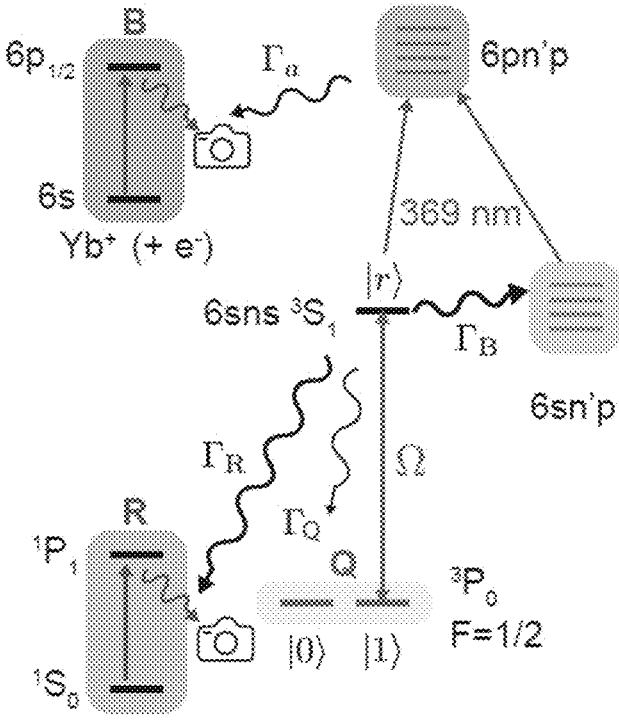
FIG. 2 illustrates quantum behavior of qubits implemented as individual $^{171}$Yb atoms as suitable for use in the neutral atom quantum computer of FIG. 1.

FIG. 2 illustrates quantum behavior of qubits implemented as individual $^{171}$Yb atoms as suitable for use in the neutral atom quantum computer of FIG. 1. The inventors note that a variety of atomic species have been explored for use in neutral atom quantum computers, and many of these atomic species are suitable for use in the various embodiments described herein. For illustrative purposes, the exemplary atomic species selected by the inventors and discussed in more detail herein is $^{171}$Yb, with the qubit encoded in the F=1/2 6s6p $^3P_0$ level. This is commonly used as the upper level of optical atomic clocks, and is metastable with a lifetime of $\tau \approx 20$ s. The qubit states are defined as $|1\rangle \equiv |m_F=1/2\rangle$ and $|0\rangle \equiv |m_F=-1/2\rangle$. State preparation, measurement and single-qubit rotations can be performed in a manner similar to existing neutral atom qubits, and a detailed prescription is discussed below.

Referring to FIG. 2, the qubit states are encoded in the metastable 6s6p $^3P_0$F=1/2 level (subspace Q), and two-qubit gates are performed via the Rydberg state $|r\rangle$, which is accessed through a single-photon transition ($\lambda$=302 nm) with Rabi frequency $\Omega$. For concreteness, consider the 6s75s $^3S_1$ state with $|F, m_F\rangle = |3/2,3/2\rangle$. The dominant errors during gates are decays from $|r\rangle$ with a total rate $\Gamma=\Gamma_B+$ $\Gamma_R+\Gamma_Q$. Only a small fraction $\Gamma_Q/\Gamma \approx 0.05$ return to the qubit subspace, while the remaining decays are either blackbody (BBR) transitions to nearby Rydberg states ($\Gamma_B/\Gamma \approx 0.61$) or radiative decay to the ground state $6s^2\ ^1S_0(\Gamma_R/\Gamma \approx 0.34)$. At the end of a gate, these events can be detected and converted into erasure errors by detecting fluorescence from ground state atoms (subspace R), or ionizing any remaining Rydberg population via autoionization, and collecting fluorescence on the $Yb^+$ transition (subspace B).

To perform two-qubit gates, for example, a state $|1\rangle$ is coupled to a Rydberg state $|r\rangle$ with Rabi frequency $\Omega$. Selective coupling of $|1\rangle$ to $|r\rangle$ can be achieved by using a circularly polarized laser and a large magnetic field to detune the transition from $|0\rangle$ to the $m_F=1/2$ Rydberg state.

The resulting three level system $\{|0\rangle, |1\rangle, |r\rangle\}$ is analogous to hyperfine qubits encoded in alkali atoms, for which numerous gate protocols have been proposed and demonstrated. These gates are based on the Rydberg blockade: the van der Waals interaction $V_{rr}(x)=C_6/x^6$ between a pair of Rydberg atoms separated by x prevents their simultaneous excitation to r if $V_{rr}(x)>>\Omega$. The gate duration is of order $t_g \approx 2\pi/\Omega >> 2\pi/V_{rr}$, and during this time, the Rydberg state can decay with probability $p=\langle P_r\rangle \Gamma t_g$, where $\langle P_r\rangle \approx 1/2$ is the average population in $|r\rangle$ during the gate, and $\Gamma$ is the total decay rate from $|r\rangle$. This is the fundamental limitation to the fidelity of Rydberg gates. It can be suppressed by increasing $\Omega$ (up to the limit imposed by $V_{rr}$), but in practice, $\Omega$ is often constrained by the available laser power. Note that the Yb $^3S_1$ series has similar interaction strength and lifetime to Rydberg series in alkali atoms.

The state r can decay via radiative decay to low-lying states (RD), or via blackbody-induced transitions to nearby Rydberg states (BBR). Crucially, a large fraction of RD events do not reach the metastable qubit subspace Q, but instead go to the true atomic ground state $6s^2\ ^1S_0$ (with suitable repumping of the other metastable states, such as $6s6p\ ^3P_2$). For an $n=75\ ^3S_1$ Rydberg state, it is estimated that 61% of decays are BBR, 34% are RD to the ground state, and only 5% are RD to the qubit subspace. Therefore, a total of 95% of all decays leave the qubit in disjoint subspaces, whose population can be detected efficiently, converting these errors into erasures. The remaining 5% can only cause Pauli errors in the computational space—there is no possibility for leakage, as the Q subspace has only two sublevels.

Decays to states outside of Q can be be detected using fluorescence on closed cycling transitions that do not disturb atoms in Q. Population in the $^1S_0$ level can be efficiently detected using fluorescence on the $^1P_1$ transition at 399 nm (subspace R in FIG. 2). This transition is highly cyclic, with a branching ratio of $\approx 1\times 10^{-7}$ back into Q. Population remaining in Rydberg states at the end of a gate can be converted into $Yb^+$ ions by autoionization on the $6s\rightarrow 6p_{1/2}$ $Yb^+$ transition at 369 nm (e.g., the population can be left in Rydberg states from spontaneous transitions as well as leakage during the gate operation). The resulting slow-moving $Yb^+$ ions can be detected using fluorescence on the same $Yb^+$ transition, as has been previously demonstrated for $Sr^+$ ions in ultracold strontium gases (subspace B in FIG. 2). As the ions can be removed after each erasure detection round with a small electric field, this approach also eliminates correlated errors from leakage to long-lived Rydberg states. It is estimated that site-resolved detection of atoms in $^1S_0$ with a fidelity F>0.999, and detection of $Yb^+$ ions with a fidelity F>0.99, can be achieved in a 10 μs imaging period. It is noted that two nearby ions created in the same cycle will likely not be detected because of mutual repulsion, but this occurs with a very small probability relative to other errors, as discussed below.

The total spontaneous emission probability, p, is divided into three classes depending on the final state of the atoms (FIGS. 1-4). The first outcome is states corresponding to detectable erasures (BQ/QB, RQ/QR, RB/BR, and RR), with probability $p_e$. The second is the creation of two ions (BB), which cannot be detected, occurring with probability $p_f$. The third outcome is a return to the qubit subspace (QQ), with probability $p_p$, which results in a Pauli error on the qubits.

FIG. 5 depicts a flow diagram of a method according to an embodiment. Specifically, the method 500 of FIG. 5 provides, illustratively, a quantum error correction (QEC) suitable for use with the neutral atom quantum computer of FIG. 1.

At step 510, qubits such as within an array of qubits in a computational space or sub-space are encoded into an encoding state(s) characterized in that an error during an idling, gate, or other operation results in a respective qubit transition to a disjoint state where that error can be detected without disturbing the qubits remaining in the computational space, as discussed in more detail herein. Referring to box 515, the qubit may comprise a neutral atom or ion. Further, the encoding state(s) may comprise a metastable state associated with a particular neutral atom or ion of interest, such as nuclear spin sublevels of the $6s6p\ ^3_{\square}P_0$ or $^3_{\square}P2$ levels in neutral $^{171}Yb$, $^{173}Yb$, $^{133}Ba$, $^{135}Ba$, $^{137}Ba$, the $5s5p\ ^3_{\square}P_0$ or $^3_{\square}P2$ levels in neutral $^{87}Sr$, or the $^2_{\square}D_{5/2}$ or $^2_{\square}F_{7/2}$ levels of alkaline earth ions such as $^{43}Ca^+$, $^{87}Sr^+$, $^{133}Ba^+$, $^{137}Ba^+$, $^{171}Yb^+$, or $^{171}Yb^+$ or other atomic or ion species with similar metastable levels.

At step 520, for each gate operation, the relevant qubits are processed in accordance with the gate operation, as described in more detail herein. It is noted that various embodiments are primarily described within the context of implementing one or more controlled Z (CZ) gates and the like. However, it will be understood that the various embodiments are suitable for use in implementing other quantum logic structures or gates, such as single qubit rotations, other two-qubit gates beyond CZ gates, multi-qubit gates, and so on. Generally speaking, the various embodiments are suitable for use with any gate where the (illustrative) two qubit subspace is left transiently for another state during the gate, and where a major source of errors at that state during the gate has a finite lifetime and a probability to decay somewhere else.

Further at step 520, after each gate operation perform a disjoint state error detection function so as to reveal the location of certain errors, converting them into erasure errors, as described in more detail herein. For example, after each gate error related events may be detected and converted into erasure errors by detecting fluorescence from ground state atoms (subspace R), or ionizing any remaining Rydberg population via autoionization, and collecting fluorescence on the $Yb^+$ transition (subspace B).

Further at step 520, note various parameters associated with the detected erasure errors, as described in more detail herein.

Further at step 520, replace or initialize any atom/ion of a qubit associated with a detected error, as described in more detail herein. That is, in response to detecting erasure errors, the error-affected atoms are replaced from an atom reservoir as needed using, e.g., a moveable optical tweezer or other atomic trapping and manipulation tool.

At step 530, the parameters of the detected errors are used together with syndrome measurements to identify respective error locations within the underlying code.

At step 540, the underlying code error locations and knowledge of the underlying code are used to identify logical errors in the underlying code associated with the loss of qubit information. Error correction may then be applied to at least the relevant portion(s) of the underlying code to mitigate the impact of the qubit related errors.

The various embodiments contemplate an arrangement whereby metastable states are used to encode a qubit and transitions outside of those are indicative of an error, which error is represented by an erasure error having associated with it various parameters such as a gate or other location in terms of processing sequence/progression or temporal sequence/progression such that the error may be mapped into the underlying code so as to identify corresponding logical errors in the underlying code and responsively apply error correction techniques to mitigate the impact of such errors.

Some embodiments provide a set of error detection techniques that are interleaved together to detect atoms that decay to a ground state or transition into other Rydberg states.

Various embodiments contemplate that the states chosen to encode the qubits comprise metastable states. In some embodiments, metastable states other than the computational states are optically pumped to a ground state to facilitate detection, while avoiding unwanted transitions into the computational space. For example, the Yb $6s6p$ $^3P_2$ level can be optically pumped to the ground state via the Yb $6s5d$ $^3D_2$ level.

Various embodiments contemplate performing gate operations by optical coupling to an excited state, which may comprise for example a low-lying excited state or a highly excited Rydberg state. The low-lying excited state may comprise a state belonging to at least one of a $6s7s$ $^3S_1$ level, a $6s5d$ $^3D_1$ level, a $6s6p$ $^3P_2$ level, or another level that may be reached from the computational space with one-photon or two-photon transitions. The highly excited Rydberg state may comprise as a state belonging to the $6sns$ $^3S_1$ $F=3/2$ Rydberg level with n substantially within a range of 40-100, or a state belonging to the $6sns$ $^3S_1$ $F=3/2$ Rydberg level with n substantially within a range of 40-100. The highly excited Rydberg state may include Rydberg levels with a Rydberg electron having orbital angular momentum $L=0$, $L=1$ or $L=2$, and principal quantum number substantially within a range of 40-100, and a total angular momentum $F=1/2$, $3/2$, or $5/2$.

Some embodiments contemplate that the qubits comprise 171-ytterbium atoms, and the encoding states comprise hyperfine states of $6s6p$ $^3P_0$ $F=1/2$ level in $^{171}$Yb. In some embodiments, the qubit is encoded in a different divalent atom such as another isotope of ytterbium, or any of the isotopes of strontium, barium, or calcium Some embodiments contemplate that a qubit transition to a disjoint state comprises a corresponding neutral atom or ion leaving the computational space, the method further comprising using cycling fluorescence to detect that a corresponding atom or ion has left the computational space.

Some embodiments contemplate directly detecting a qubit population remaining in Rydberg states at the end of each gate, without performing (or requiring) error syndrome measurements with ancilla qubits. Detecting atoms remaining in Rydberg states may be performed by ionizing them using an autoionizing excitation on a core electron and then detecting cycling fluorescence from the same transition in the ion (e.g., a transition such as the Yb+ $6s$-$6p_{1/2}$ transition). Detecting atoms in trapped Rydberg states may be performed by waiting for the atoms to decay to the ground state and detecting cycling fluorescence from the ground state.

In some embodiments, detecting atoms remaining in Rydberg states may be performed by ionizing them using an autoionizing excitation on a core electron and then detecting the ions directly with an ion detector and ion optics.

Some embodiments contemplate restoring error-affected qubits to the computational space by replacing the error-affected atoms with new atoms or by reinitializing the atoms into the computational space.

Some embodiments contemplate implementing a quantum circuit to measure error syndromes of an error correcting code, and using the measured syndromes and a detected location of erasure errors to infer a presence of a logical qubit error with lower failure probability than using the syndromes alone.

Some embodiments contemplate restoring error-affected qubits to the computational space in the state $|1\rangle$, by replacing the error-affected atoms with new atoms or by reinitializing the atoms into the computational space, where the resulting qubit state has at most a dephasing error resulting in a biased erasure error.

Some embodiments contemplate implementing a quantum circuit to measure error syndromes of an error correcting code, and using the measured syndromes together with a detected location of biased erasure errors to infer a presence of a logical qubit error with lower failure probability than using the syndromes alone.

Figure 6A:
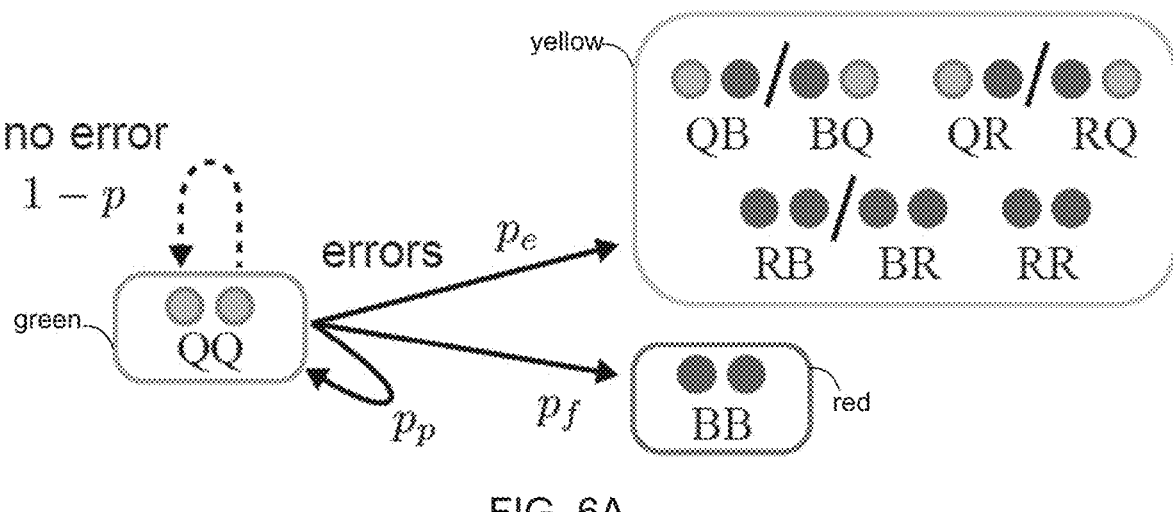
FIG. 6A illustrates possible atomic states at the end of a two-qubit gate.

FIG. 6A illustrates possible atomic states at the end of a two-qubit gate. The configurations grouped in the yellow box are detectable erasure errors; red, undetectable errors; and green, the computational space (figure marked to indicate colors).

Figure 6B:
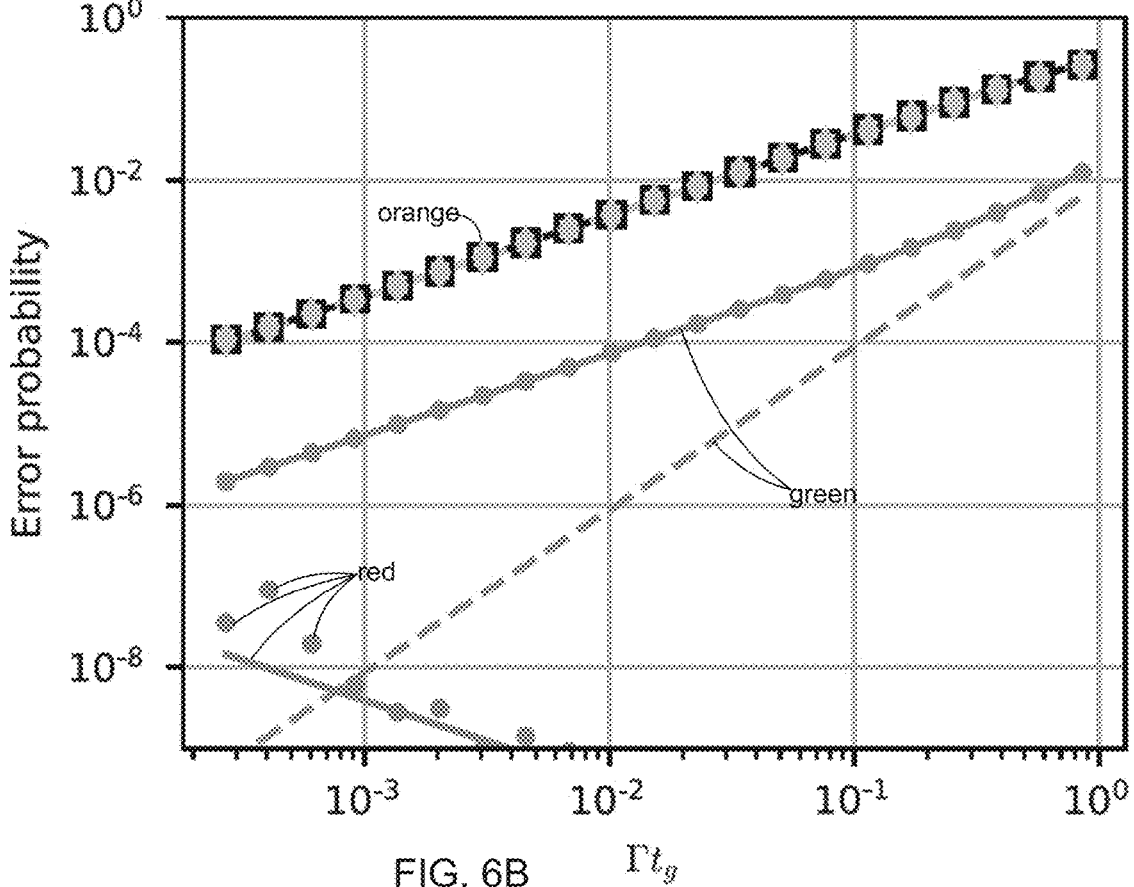
FIG. 6B graphically depicts gate error as a function of the gate duration $t_g$ of a two-qubit gate.

FIG. 6B graphically depicts gate error as a function of the gate duration $t_g$ of a two-qubit gate (figure marked to indicate colors). The average gate infidelity $1$-$\mathcal{F}$ (black squares) is dominated by detectable erasures with probability $p_e$ (orange points). The infidelity conditioned on not detecting an erasure, $1$-$\mathcal{F}_{\bar{e}}$ (green points) is about 50 times smaller. This reflects decays to Q with probability $p_p$, and a no-jump evolution contribution (green dashed line). The probability $p_f$ of undetectable leakage (red points) is very small. The lines are analytic estimates of each quantity, while the symbols are numerical simulations. Both assume $V_{rr}/\Gamma=106$, and $\Omega$ is varied along the horizontal axis.

The value of p and its decomposition depends on the specific Rydberg gate protocol. Referring now to a particular example, the symmetric CZ gate, which implements a nonlinear phase shift of $\pi$ via the Rydberg blockade effect, using a combination of mathematical analysis and numerical simulations of the Lindblad master equation and summarized with respect to FIG. 2.

The probability of a detectable erasure, $p_e$, is almost identical to the average gate infidelity $1$-$\mathcal{F}$, indicating that the vast majority of errors are of this type. Infer the rate of Pauli errors on the qubits from the fidelity conditioned on not detecting an erasure, $\mathcal{F}_{\bar{e}}$, as $p_p=1$-$\mathcal{F}_{\bar{e}}$, and find $p_p \approx p_e/50$. Non-detectable leakage (BB) is strongly suppressed by the Rydberg blockade, and find $p_f < 10^{-4} \times p_e$ over the relevant parameter range. Since decays occur preferentially from 1, continuously monitoring for erasures introduces an additional probability of gate error from non-Hermitian no-jump evolution, proportional to $$p_e^2,$$

which is insignificant for $p_e < 0.1$.

We conclude that this approach effectively converts a fraction $R_e = p_e/(p_e + p_p) = 0.98$ of all spontaneous decay errors into erasures. This is a larger fraction than would be naïvely predicted from the branching ratio into the qubit subspace, $1 - \Gamma_Q/\Gamma = 0.95$, because decays to Q in the middle of the gate result in re-excitation to $|r\rangle$ with a high probability, triggering an erasure detection. This value is in agreement with analytic estimates.

Surface Code Simulations

The performance of an error correcting code with erasure conversion using circuit-level simulations will now be discussed. Consider the planar XZZX surface code, which has been studied in the context of biased noise, and performs identically to the standard surface code for the case of unbiased noise. Using Monte Carlo simulations of errors in a d×d array of data qubits to implement a code with distance d, and estimate the logical failure rate after d rounds of measurements.

Figures 3, 4:
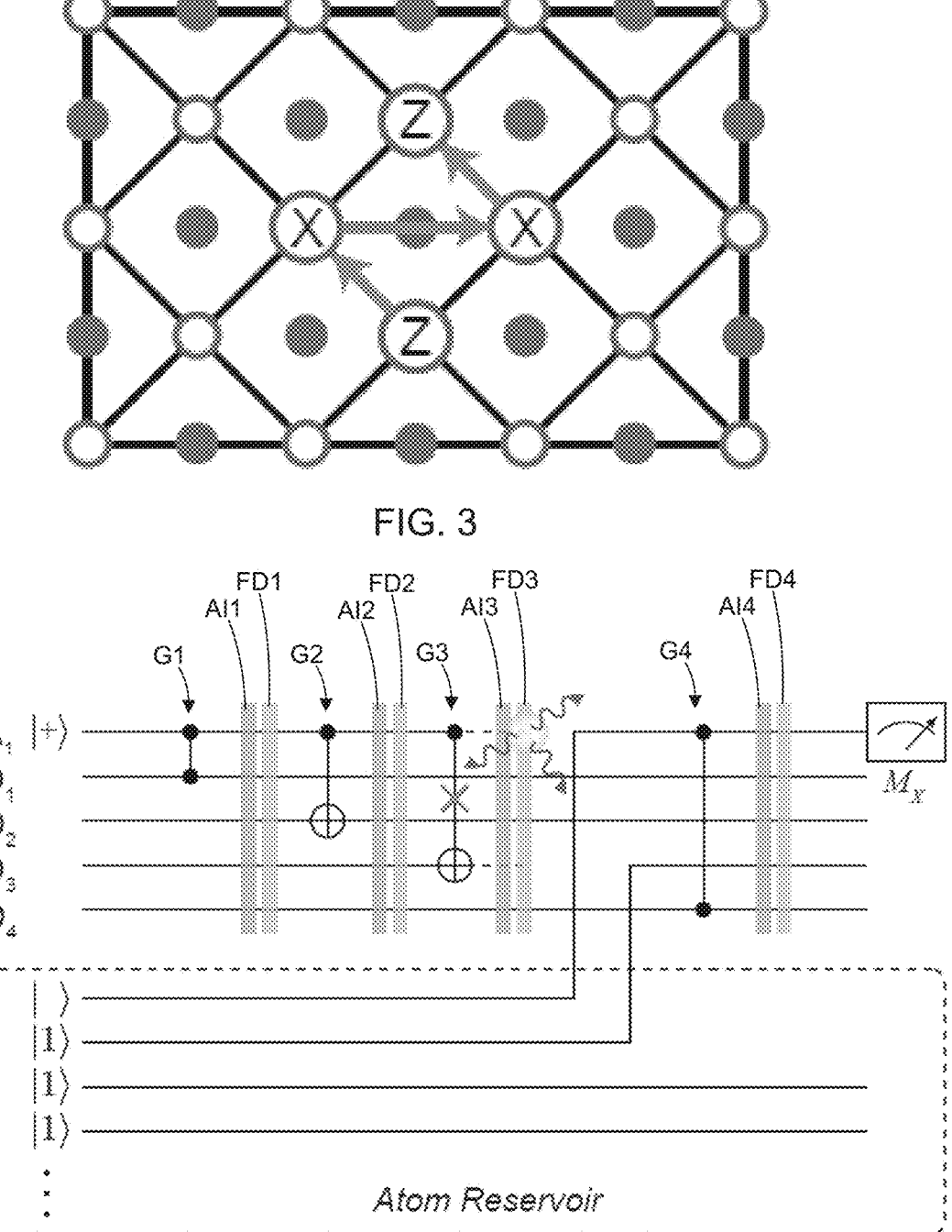
FIG. 3 graphically depicts a patch of an XZZX surface code used within exemplary embodiments discussed herein.
FIG. 4 schematically illustrates a quantum circuit representing a single stabilizer measurement in an XZZX surface code with erasure conversion.

Each two-qubit gate experiences either a Pauli error with probability $p_p = p(1 - R_e)$, or an erasure with probability $p_e = pR_e$. The Pauli errors are drawn uniformly at random from the set $\{I, X, Y, Z\}^{\otimes 2} \backslash \{I \otimes I\}$, each with probability $p_p/15$. Following a two-qubit gate in which an erasure error occurs, both atoms are replaced with fresh ancilla atoms in a mixed state I/2 (FIG. 4). This is modelled in the simulations by applying a Pauli error chosen uniformly at random from $\{I, X, Y, Z\}^{\otimes 2}$. The simulation does not consider single-qubit gate errors or ancilla initialization or measurement errors at this stage.

FIG. 3 graphically depicts a patch of an XZZX surface code used within exemplary embodiments discussed herein. FIG. 4 schematically illustrates a quantum circuit representing a single stabilizer measurement in an XZZX surface code with erasure conversion. Specifically, the quantum circuit 400 of FIG. 4 contemplates a plurality of gates (illustratively, G1 through G4), wherein erasure detection is applied after each gate via corresponding atom ionization (AI1 through AI4) resulting in fluorescence that may be detecting via corresponding fluorescence detection (FD1 through FD4) as described herein. In response to detecting erasure errors, the erased atoms are replaced from an atom reservoir as needed using a moveable optical tweezer.

Referring to FIG. 4, at each of gates G1-G4 two respective qubits are presented/processed in accordance with the gate function (e.g., CZ or other function) and an error check is performed using a fluorescence measurement as described herein. An atom associated with an erasure error may be reinitialized (if still available) or replaced with a new atom from the atom reservoir.

Various embodiments discussed above contemplate that a replacement atom is associated with a random state, or is associated with a particular state such as an active or "1" state or spin. For example, as noted in FIG. 4, the atoms in the atom reservoir are depicted as "1" state or spin atoms.

As discussed herein, an optical tweezer is suitable for use for replacing atoms within the context of the planar XZZX surface code discussed herein. For non-planar lattices, techniques/tools other than those associated with an optical tweezer may be well suited to the task of atom replacement. Such techniques/tools may comprise moveable optical lattices or other optical dipole traps.

The syndrome measurement results, together with the locations of the erasure errors, are decoded with weighted Union Find (UF) decoder to determine whether the error is correctable or leads to a logical failure. The UF decoder is optimal for pure erasure errors, and performs comparably to conventional matching decoders for Pauli errors, but is considerably faster.

Figure 7A:
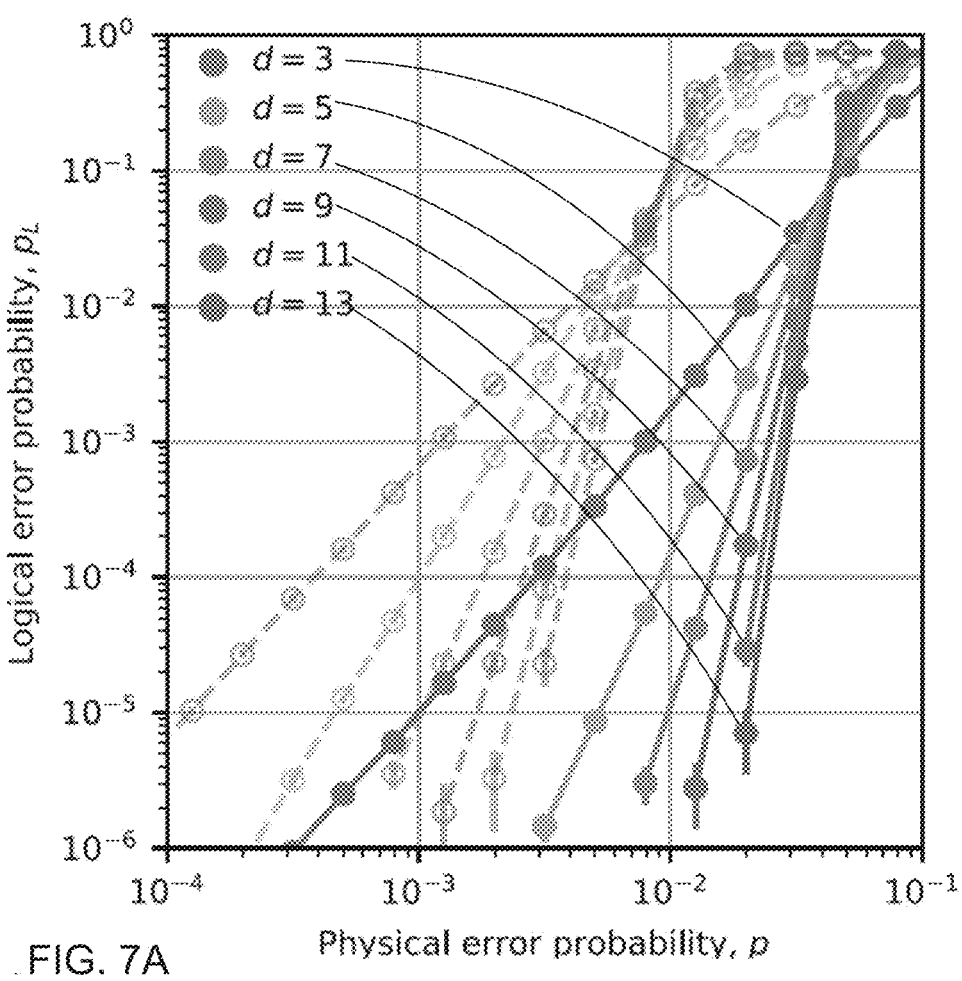
FIGS. 7A-7B graphically depict circuit-level logical error probabilities and error thresholds in the presence of erasure errors.
Figure 7B:
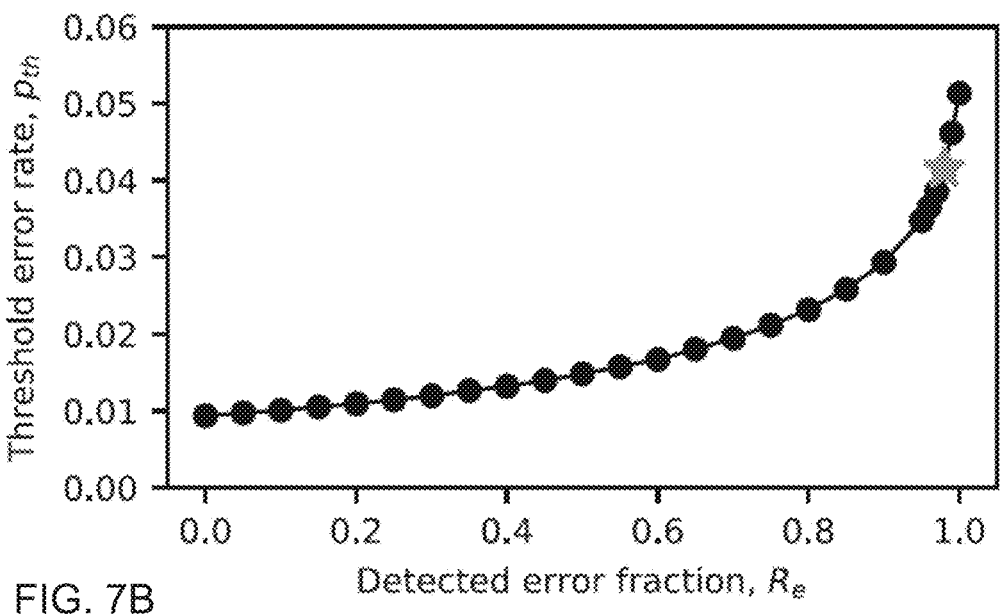

FIGS. 7A-7B graphically depict circuit-level error thresholds in the presence of erasure errors. Specifically, FIG. 7A graphically depicts scaling of the logical error rate with the physical qubit error rate p in the case of pure computational errors ($R_e = 0$, open circles, dashed lines) and in the case of a high conversion to erasure errors, $R_e = 0.98$ (filled circles, solid lines). The error thresholds are $p_{th} = 0.937$ (4) % and $p_{th} = 4.15$ (2) %, respectively, determined from the crossing of d=11 and d=15. The error bars indicate the 95% confidence interval in $p_L$, estimated from the number of trials in the Monte Carlo simulation. FIG. 7B graphically depicts $p_{th}$ as a function of $R_e$ (The star highlights $R_e = 0.98$.).

FIG. 7A presents the simulation results for $R_e = 0$ and $R_e = 0.98$. The former corresponds to pure Pauli errors, while the latter corresponds to the level of erasure conversion anticipated in $^{171}$Yb. The logical errors are significantly reduced in the latter case. The fault-tolerance threshold, defined as the physical error rate where the logical error rate decreases with increasing d, increases by a factor of 4.4, from $p_{th} = 0.937\%$ to $p_{th} = 4.15\%$. FIG. 7B plots the threshold as a function of $R_e$. It reaches 5.13% when $R_e = 1$. The smooth increase of the threshold with $R_e$ is qualitatively consistent with surface code performance with mixed erasures and Pauli errors.

In addition to increasing the threshold, the high fraction of erasure errors also results in a faster decrease in the logical error rate below the threshold. Below the threshold, $p_L$ can be approximated by $Ap^v$, where the exponent v is the number of errors needed to cause a logical failure. A larger value of v results in a faster suppression of logical errors below the threshold, and better code performance for a fixed number of qubits (i.e., fixed d).

Figure 8A:
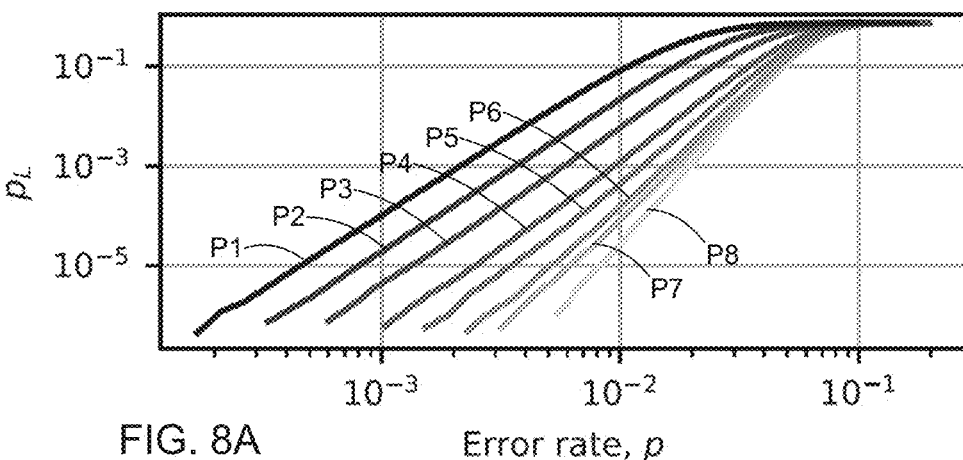
FIGS. 8A-8C graphically depict logical error scaling below the error threshold.
Figure 8B:
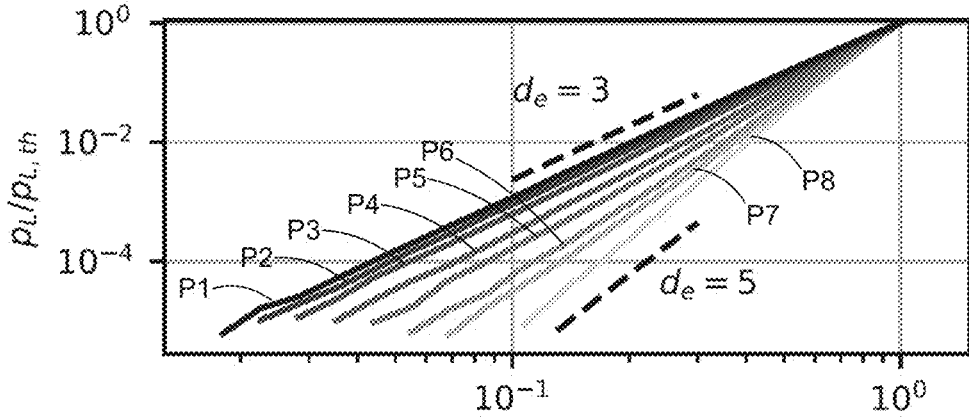
Figure 8C:
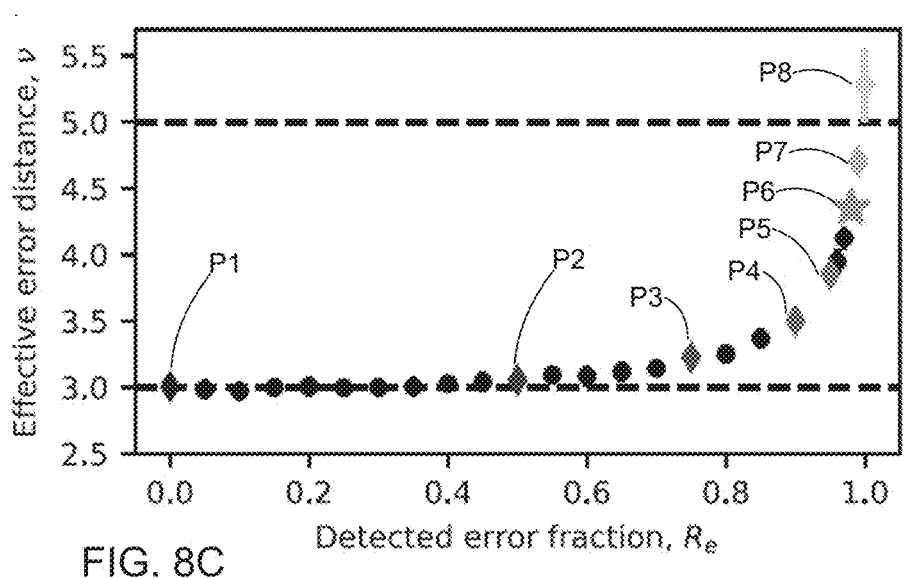

FIGS. 8A-8C graphically depict logical error scaling below the error threshold. Specifically, FIG. 8A graphically depicts $p_L$ vs p at a fixed code distance d=5 for various values of $R_e$. FIG. 8B graphically depicts the physical and logical error rates are rescaled by their values at the threshold. FIG. 8C graphically depicts logical error exponent v, extracted from the slope of the curves in FIG. 8B. The dashed lines show the expected asymptotic exponents for pure computational errors ($v_p = 3$) and pure erasure errors ($v_e = 5$).

FIG. 8A plots the logical error rate as a function of the physical error rate for a d=5 code for several values of $R_e$. When normalized by the threshold error rates (FIG. 8B), it is evident that the exponent (slope) v increases with $R_e$. The fitted exponents (FIG. 8C) smoothly increase from the expected value for pure Pauli errors, $v_p = (d+1)/2 = 3$, to the expected value for pure erasure errors, $v_e = d = 5$ (in fact, it exceeds this value slightly in the region sampled, which is close to the threshold). For $R_e = 0.98$, $v = 4.35(2)$. Achieving this exponent with pure Pauli errors would require d=7, using nearly twice as many qubits as the d=5 code in FIG. 8A-8C. For very small p, the exponent will eventually return to $v_p$, as the lowest weight failure ($v_p$ Pauli errors) will become dominant. The onset of this behavior is barely visible for d=5 in FIG. 7A.

Discussion

There are several points worth discussing. First, the threshold error rate for $R_e = 0.98$ corresponds to a two-qubit gate fidelity of 95.9%, which is exceeded by the current state-of-the-art. Entangled states with fidelity $\mathcal{F}$=97.4% have been demonstrated for hyperfine qubits in Rb, and $\mathcal{F}$=99.1% has been demonstrated for ground-Rydberg qubits in $^{88}$Sr. With reasonable technical improvements, a reduction of the error rate by at least one order of magnitude has been projected, which would place neutral atom qubits far below the threshold, into a regime of genuine fault-tolerant operation. Arrays of hundreds of neutral atom qubits have been demonstrated, which is a sufficient number to realize a single surface code logical qubit with d=11, or five logical qubits with d=5. The surface code is considered as an example because of the availability of simple, accurate decoders; however, erasure conversion produces similar benefit with any error correcting code. As such, the various embodiments are directed to other codes as well. In combination with the flexible connectivity of neutral atom arrays enabled by dynamic rearrangement, this opens the door to implementing a wide range of efficient codes.

Second, in order to compare erasure conversion to previous proposals for achieving fault-tolerant Rydberg gates by repumping leaked Rydberg population in a bias-preserving manner, the inventors have also simulated the XZZX surface code with biased noise and bias-preserving gates. For noise with bias η (i.e., if the probability of X or Y errors is n times smaller than Z errors), finding a threshold of $p_{th}$=2.27% for the XZZX surface code when η=100, which increases to $p_{th}$=3.69% when η→∞. For comparison, the threshold with erasure conversion is higher than the case of infinite bias if $R_e$≥0.96.

Third, the analysis has focused on two-qubit gate errors, since they are dominant in neutral atom arrays, and are also the most problematic for fault-tolerant error correction. However, with very efficient erasure conversion for two-qubit gate errors, the effect of single-qubit errors, initialization and measurement errors, and atom loss may become more significant. In the supplementary information presented below, additional simulations are presented showing that the inclusion of initialization, measurement, and single-qubit gate errors with reasonable values does not significantly affect the threshold two-qubit gate error. It is noted that erasure conversion can also be effective for other types of spontaneous errors, including Raman scattering during single qubit gates, the finite lifetime of the $^3P_0$ level, and certain measurement errors. Atom loss can occur spontaneously (i.e., from collision with background gas atoms) or as a result of an undetected erasure, but these probabilities are both very small compared to p. In this regime, these undetected leakage events can be handled fault-tolerantly with only one extra gate per stabilizer measurement, with very small impact on $P_{th}$.

It is noted that erasure conversion can lead to more resource-efficient, fault-tolerant subroutines for universal computation, such as magic-state distillation. This protocol uses several copies of faulty resource states to produce fewer copies with lower error rate. This is expected to consume large portions of the quantum hardware, but the overhead can be reduced by improving the fidelity of the input raw magic states. By rejecting resource states with detected erasures, the error rate can be reduced from O(p) to O((1− $R_e$)p). Therefore, 98% erasure conversion can give over an order of magnitude reduction in the infidelity of raw magic states, resulting in a large reduction in overheads for magic state distillation.

Figures 13A, 13B:
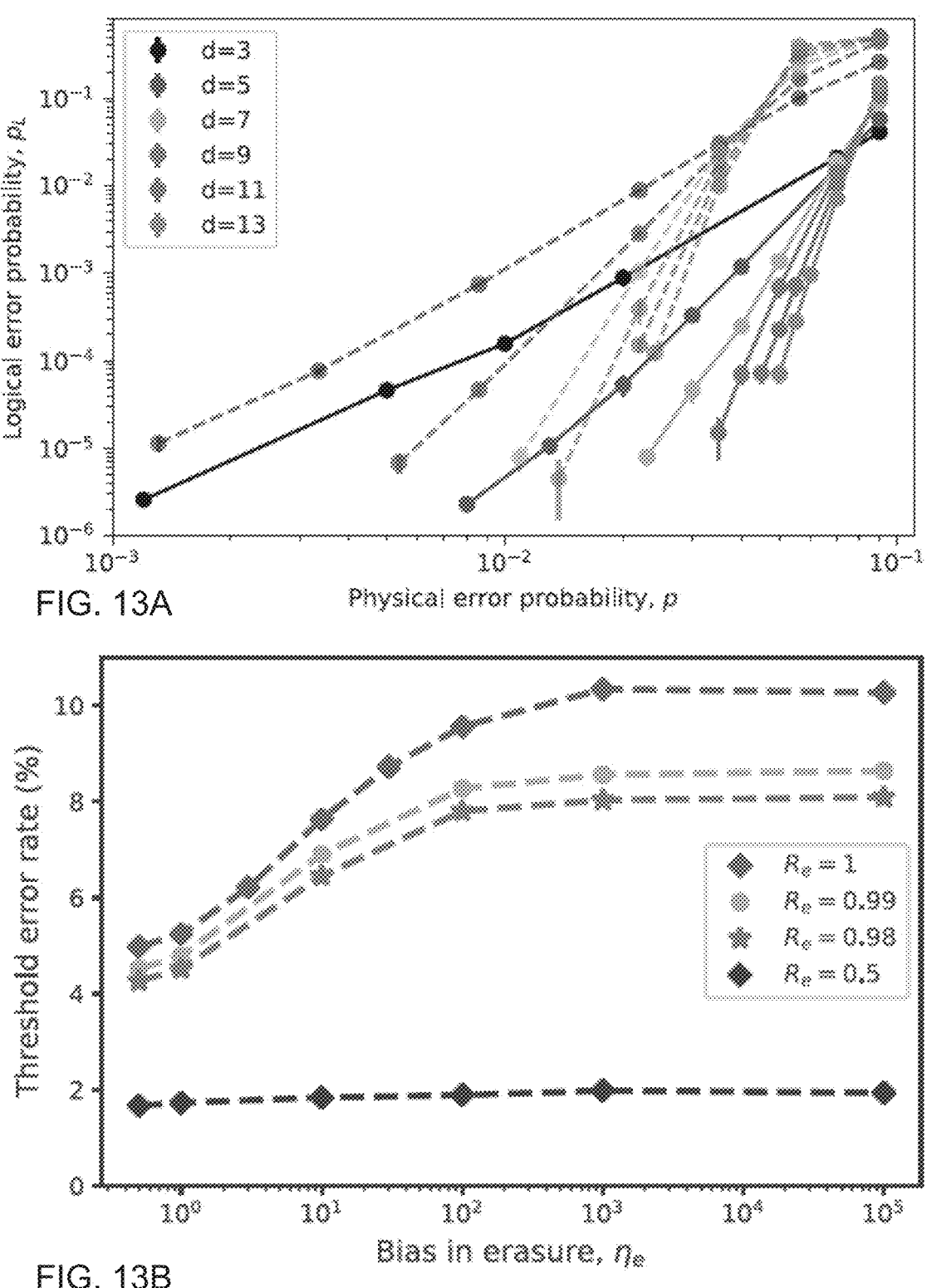
FIGS. 13A-13B graphically depict circuit-level logical error probabilities and error thresholds in the presence of erasure errors.

Some embodiments use a variation on the approach described above so as to reach even higher thresholds. The analysis generally discussed herein considers qubits that have had erasure errors to be fully depolarized, which is consistent with prior studies of error correcting codes under the erasure channel. The analysis generally discussed herein also considered that both qubits in a two-qubit gate become fully depolarized when either qubit has an erasure error. However, because the atoms are only excited to the Rydberg state from the qubit level |1⟩ (as indicated in FIG. 2), the detection of an erasure on one of the qubits is equivalent to a measurement of that qubit in the Z basis with outcome +1, which can give rise to a dephasing error on that qubit and the other qubit in the two-qubit gate, but cannot give rise to a bit-flip on either qubit. If the error-affected qubit is subsequently replaced or re-initialized into the same state (as depicted in FIG. 4), and the other qubit is not replaced or re-initialized, the resulting code state has at most a dephasing (Z) error at the position of the erasure, which is a form of error bias. It is noted that bias-preserving gates may be required to take advantage of error bias of this type, as discussed previously herein, because gate operations in the stabilizer circuit (such as Hadamard gates) convert Z type errors into X type errors, undoing the bias. However, the inventors have observed that since the space-time location of the Z errors in the circuit is known, their evolution can be tracked through the circuit to predict whether they will manifest as Z or X type errors in the syndrome measurement (e.g., the error model consisting of erasures manifesting only as Z errors) as a biased erasure model. By modifying the decoder to incorporate this information, a threshold of 8.1% can be realized for the biased erasure model if $R_e$=0.98, improving to 10.3% when $R_e$=1. An example of the logical error rate as a function of the physical error rate under this biased erasure model is shown in FIG. 13A.

As with other forms of biased noise, the biased erasure model can be parameterized by the relative probability of the dominant Z error, $p_z$, and that of the minority X,Y errors, $p_x$, $p_y$, by a bias parameter η given by, η=$p_z$/($P_x$+$P_y$). To achieve the improved thresholds discussed in the previous paragraph, a large value of η is required, such as 1000, as shown in FIG. 13B. A slightly smaller threshold is obtained for η=100.

Various embodiments contemplate an approach for efficiently implementing fault-tolerant quantum logic operations in neutral atom arrays using $^{171}$Yb. By leveraging the unique level structure of this alkaline earth atom, the embodiments convert the dominant source of error for two-qubit gates—spontaneous decay from the Rydberg state—into directly detected erasure errors. It is noted that a 4.4-fold increase in the circuit-level threshold for a surface code is found, bringing the threshold within the range of current experimental gate fidelities in neutral atom arrays. Combined with a steeper scaling of the logical error rate below the threshold, this approach is promising for demonstrating fault-tolerant logical operations with near-term experimental hardware. The inventors anticipate that erasure conversion will also be applicable to other codes and other physical qubit platforms, such as ions and superconducting qubits.

Methods

Error Correcting Code Simulations

In this section, additional details are provided about the simulations used to generate the results shown in FIGS. 7A-7B and FIGS. 8A-8C. Assign each two-qubit gate to have an error from the set $\{I, X, Y, Z\}^{\otimes 2}\backslash\{I\otimes I\}$ with probability $p_p$/15, and an erasure error with probability $p_e$, with $p_e$/($p_p$+$p_e$)=$R_e$. Immediately after an erasure error on a two-qubit gate, in some embodiments both qubits may be re-initialized in a completely mixed state which is modelled using an error channel $(I\rho1+X\rho X+Y\rho Y+Z\rho Z)/4$ on each qubit (in other embodiments, as discussed below, the qubits may be re-initialized in a predefined or non-mixed state). In the case of an erasure, the qubit is replaced with a completely mixed state and the recorded measurement outcome is random. This model is chosen for simplicity, but in the experiment better performance may be realized using an ancilla polarized into $|1\rangle$ as Rydberg decays only happen from this initial state. Assume the existence of native CZ and CNOT gates, so a stabilizer cycle can be completed without single-qubit gates. Neglect idle errors, since these are typically insignificant for atomic qubits.

Ancilla initialization (measurement) are handled in a similar way, with a Pauli error following (preceding) a perfect operation, with probability $p_m$ ($p_m=0$ in FIGS. 7A-7B and FIGS. 8A-8C, but results for $p_m>0$ are shown in FIG. 8). Assume the existence of native CZ and CNOT gates, so a stabilizer cycle can be completed without single-qubit gates. Neglect idle errors, since these are typically insignificant for atomic qubits.

The inventors simulated the surface code with open boundary conditions. Each syndrome extraction round proceeds in six steps: ancilla state preparation, four two-qubit gates applied in the order shown in FIG. 3, and finally a measurement step. For a d×d lattice, perform d rounds of syndrome measurements, followed by one final round of perfect measurements. The decoder graph is constructed by connecting all space-time points generated by errors in the circuit applied as discussed above. Each of these edges is then weighted by ln (p') truncated to the nearest integer, where p' is the largest single error probability that gives rise to the edge. After sampling an error, the weighted UF decoder is applied to determine error patterns consistent with the syndromes. Some embodiments do not apply the peeling decoder, but account for logical errors by keeping track of parity of defects crossing the logical boundaries.

For the comparison to the threshold of the XZZX code when the noise is biased, apply errors from $Q=\{I, X, Y, Z\}^{\otimes2}\backslash\{I\otimes I\}$ after two qubit gate with probability $p_Q$. The first (second) operator in the tensor product is applied to the control (target) qubit. Assume bias-preserving CNOT gates and thus use $p_{ZI}=p$, $p_{IZ}=p_{ZZ}=p/2$ with the probability of other non-pure-dephasing Pauli errors=$p/\eta$. For the CZ gate use $p_{ZI}=p$, $p_{IZ}=p$ with the probability of other non-pure-dephasing Pauli errors=$p/\eta$. For the threshold quoted in the main text no single-qubit preparation and measurement noise is applied, to facilitate direct comparison to the threshold with erasure conversion in FIG. 7. As described above, the threshold is quoted in terms of the total two-qubit gate infidelity ~2p for large $\eta$, to facilitate comparison to the threshold in FIG. 7.

$^{171}$Yb Gate Operations

The following is an example of a universal set of gate operations on qubits encoded in the metastable $^3P_0$ level of $^{171}$Yb. These closely follow techniques for ground state qubits. Metastable qubit gate operations may also be provided using trapped atomic ions.

Starting with an atom in $^1S_0$, initialization into $|1\rangle$ can be performed by optically pumping into $^1S_0$, $m_F=1/2$ and transferring to the $^3P_0$ (manifold Q) using the clock transition. Mid-circuit measurement can be performed using the same clock pulse to selectively transfer population in $|1\rangle$ to $^1S_0$, and measuring the $^1S_0$ population with fluorescence. As an alternative to driving the clock transition, optical pumping via intermediate S and D states can also be used.

Single qubit gate rotations can be performed using Raman transitions and light shifts on the 6s7s $^3S_1$ transition (649 nm), via other low-lying levels, or via the Rydberg state. In both cases, errors can arise from photon scattering, but erasure conversion can be performed at a similar or greater level than for the two-qubit gates discussed in the main text (see section 5).

Yb Branching Ratios

In this section, consider the decay pathways from the Rydberg state, which determine the probability that a spontaneous decay is converted into an erasure. These calculations involve dipole matrix elements between ground states and Rydberg states in Yb that have not been directly measured or computed with rigorous many-body techniques. Therefore, they are estimated using a single active electron approximation, and wavefunctions may be computed using, illustratively, the Numerov technique, an implicit linear multistep method for differential equations. The inventors focus on the 6s75s $^3S_1$ F=3/2 state for concreteness.

Figure 9A:
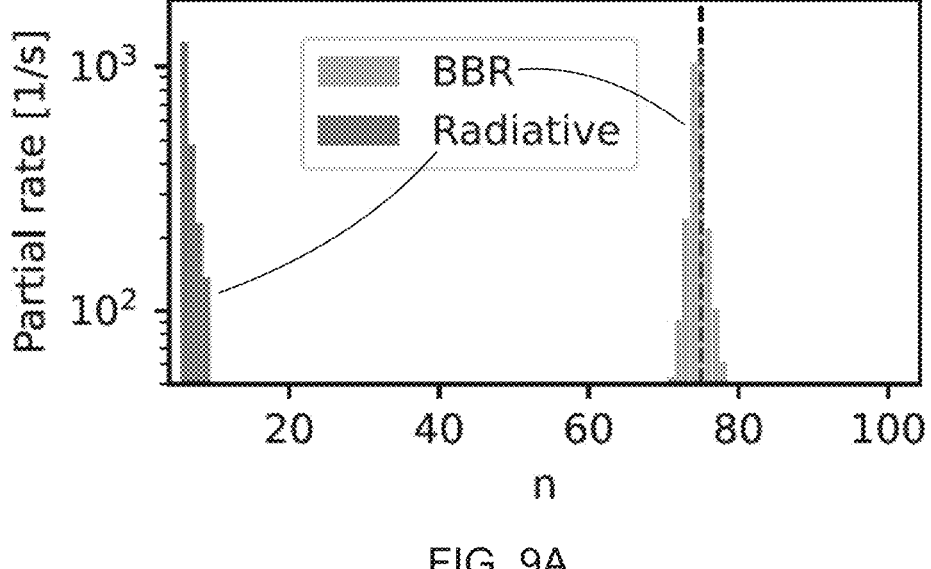
FIGS. 9A-9C graphically depict decay pathways from the Yb $^3S_1$ Rydberg series and branching ratios into various states.
Figure 9B:
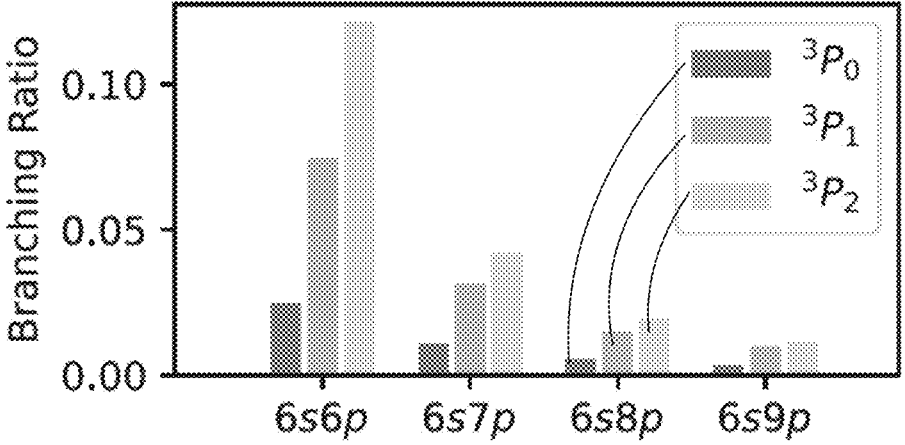
Figure 9C:
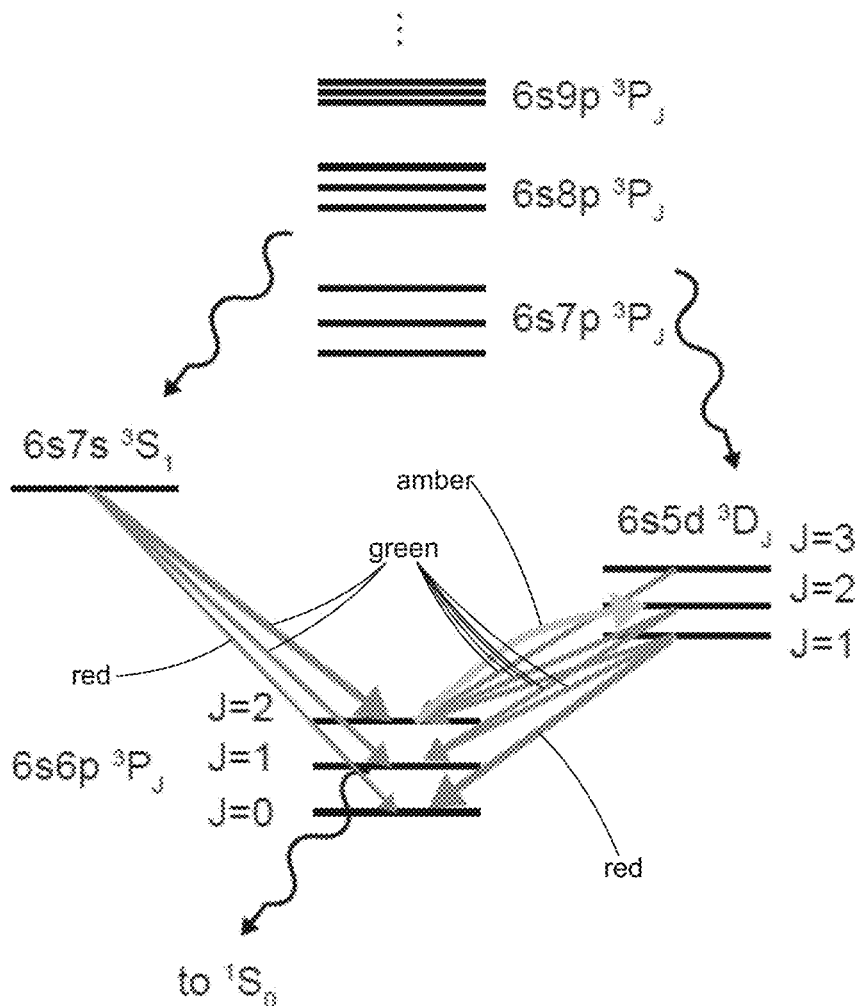

FIGS. 9A-9C graphically depict decay pathways from the Yb $^3S_1$ Rydberg series (figures marked to indicate colors). The decay pathways can be separated into BBR decays to nearby n and radiative decays to low-n states. For $\eta=75$, the BBR decay rate is 3480 1/s, and the radiative decay rate is 2200 1/s, which gives a branching ratio of 0.39 into radiative decay, and 0.61 into BBR decay. FIG. 9A graphically illustrates partial decay rates to all P states of a given principal quantum number n, starting from n=75. BBR transitions to nearby states are shown in red, and radiative decay to lower n states are shown in blue. Final states with n=10-35 are not included because of the absence of spectroscopic data.

The radiative decays favor the lowest energy states, because of the larger density of states at the relevant transition energy. However, angular momentum algebra favors higher J states within the same fine structure manifold. Therefore, the fraction of decays that terminate directly in the J=0 qubit manifold Q is only 0.025. FIG. 9B graphically illustrates branching ratio into low-energy 6sps $^3P_J$ states. The branching ratio into the qubit manifold Q, 6s6p $^3P_0$, is 2.5%.

Decay events to 6s6p $^3P_1$ will quickly relax to the ground state $^1S_0$ via a second spontaneous decay. Decays to 6s6p $^3P_2$ can be repumped to 6s6p $^3P_1$ via 6s5d $^3D_2$, which cannot decay to the qubit subspace because of angular momentum selection rules.

However, approximately 0.17 of all the decay events are to 6snp states with n>6. These states will overwhelmingly decay to the 6s7s $^3S_1$ and 6s5d $^3D_J$ states, which in turn can decay to 6s6p states. FIG. 9C depicts a partial energy diagram showing relevant transitions between low-lying states. Decays in red are to Q, while the orange transition can be used to repump $^3P_2$ without populating Q.

While data is not readily available to estimate the relative branching ratio between the S and D decay pathways, the inventors can estimate the fraction of decays that return to Q within each pathway.

The state 6s7s $^3S_1$ decays into the 6s6p $^3P_J$ levels with a branching ratio that can be estimated as:

$$\frac{\Gamma_J}{\Gamma_{tot}} = \frac{1}{N}\omega_J^3(2J+1)(2L'+1)\begin{Bmatrix} L & L' & 1 \\ J' & J & S \end{Bmatrix}^2 \tag{1}$$

where the quantity $$\begin{Bmatrix} L & L' & 1 \\ J' & J & S \end{Bmatrix}$$

denotes the Wigner-6J symbol.

Here, the primed quantities denote the angular momenta of the initial state ($^3S_1$), and the unprimed quantities for the final state ($^3P_J$). $\omega_J$ is the transition frequency for the decay to the state J, and the normalization constant $\mathcal{N}$ ensures $\Sigma_J$, $\Gamma_J = \Gamma_{tot}$. The branching ratios into J={0,1,2} are {0.15,0.40, 0.45}. Therefore, around 0.15 of all decays via $^3S_1$ will reach Q.

In the case of decays via the 6s5d $^3D_J$ states, use Eq. (1) to estimate the branching ratio from 6snp $^3P_J$, to the various $^3D_J$ states. Since only $^3D_1$ can decay to the Q, only state this fraction, which is approximately {1,0.25,0.01} when starting from 6snp $^3P_J$, with J'={0,1,2}. The branching ratio from 6s5d $^3D_1$ to Q is estimated as 0.65. Combining this with the distribution of population among the 6snp $^3P_J$, levels in FIG. 9B, arrive at an estimate that 0.16 of the decays via D states terminate in Q.

As the probability to end up in Q via the S or D decay pathways is similar, the (unknown) branching ratio between them becomes unimportant. Taking it to be 0.5, the inventors conclude that 14% of decays from 6snp levels with n>6 return to Q. Adding this to the direct decays to Q, arriving at a final estimate that 0.051 of all Rydberg decays return to the qubit manifold Q.

Lastly, it is noted that this analysis does not include the effect of doubly-excited states that perturb the Rydberg series, which can give rise to additional decay pathways. In Yb, these are especially prominent because of the number of core excited states. There is not enough spectroscopic data about the Yb Rydberg series to quantitatively evaluate the impact of series perturbers. However, it is noted that these doubly excited states will require a minimum of three spontaneous decays to reach the 6s6p $^3P_J$ states. Given the general propensity to decay to higher/states at each step, it is likely that the branching ratio into $^3P_0$ from doubly-excited perturbers will not be worse than the values estimated above.

This description does not explicitly include hyperfine structure in these calculations, but rather calculate matrix elements between J states in $^{174}$Yb. This is an excellent approximation for the transitions from low-n to Rydberg states, since these matrix elements are mainly sensitive to the Rydberg state quantum defect, and the $^3S_1$,F=3/2 Rydberg state that the inventors consider has the same quantum defect as the $^3S_1$ series in $^{174}$Yb because its core electron configuration is purely Yb$^+$F=1. However, it is possible that the BBR transition rate varies slightly between isotopes, since the hyperfine splitting changes the energy level spacing by a significant amount. The error from this approximation is much less than the uncertainty arising from unknown series perturbers.

Erasure Detection Fidelity

Detection of Atoms in $^1S_0$

First consider the localized detection fidelity for atoms $^1S_0$, using the cycling transition in the R manifold. Many protocols for imaging atoms in tweezers focus on non-destructive detection, and therefore image slowly while simultaneously cooling, which is not optimal for minimizing computational cycle time. Here it is instead desired to achieve rapid but destructive detection, with the aim of replacing atoms from a reservoir when erasures are detected (which occurs with a low probability). To estimate the fidelity, take the atoms to be initially at rest, ignore the dipole trap, and assume illumination by counter-propagating fields above saturation, such that the photon scattering rate is $\Gamma/2$. This results in no net force on the atom, but momentum diffusion from photon recoils leads to an increasing mean squared atomic displacement of:

$$\langle x^2(t) \rangle = \frac{v_{rec}^2}{3} \frac{t^3}{3} \frac{\Gamma}{2} = \frac{\hbar^2 k^2}{18m^2} t^3 \Gamma \tag{2}$$

where $\Gamma = 2\pi \times 28$ MHz is the $^1S_0 - ^1P_1$ transition linewidth, the wavevector $k = 2\pi/\lambda$ with $\lambda = 399$ nm, and m is the atomic mass.

Various embodiments contemplate a tweezer array with a spacing of a=3–5 $\mu$m, and therefore require that $\sqrt{\langle x^2(t) \rangle} < a/2$ to determine which site is fluorescing. Free-space imaging of single $^6$Li atoms with a detection fidelity of 99.4% is achieved after an imaging time of 20 seconds, after which time $\sqrt{\langle x^2(t) \rangle}^{1/2} = 10.4$ micrometers. During this time, approximately 330 photons were scattered, and 25 detected, with an EMCCD and a modest numerical aperture objective (NA=0.55). However, for the same number of detected photons, the position spread scales as $1/(m\lambda\Gamma)$, and this quantity is a factor of 81 smaller for the heavy $^{171}$Yb compared to $^6$Li, so the inventors anticipate a position spread of only 120 nm for the same conditions. Therefore, achieving imaging fidelity greater than 99.9% should be readily achievable for atoms in $^1S_0$, in less than half the time, since the scattering rate for Yb is more than 3 times larger.

Detection of Ions

Now consider the detection fidelity of Yb$^+$ ions using the cycling transition in manifold B following autoiniozation out of a Rydberg state. Ions created from Rydberg atoms have been imaged using fluorescence in ultracold quantum gases of strontium. Compared to detecting neutral atoms, there are two additional factors to consider: an initial velocity $v_0$ arising from recoil momentum from the ejected electron, and acceleration due to a background electric field or the presence of other ions. Begin by considering the initial velocity: when a 6p$_{1/2}$np Rydberg state decays to Yb$^+$(6s)+e$^-$ via autoionization, the electron carries away an energy $\Delta E \approx I_{6p_{1/2}} - I_{6s} \approx 27100$ cm$^{-1}$, where $I_j$ is the ionization limit for Yb$^0$ corresponding to the ion core in state j, making the approximation that the electron mass is very small compared to the ion mass. In this case, the ion acquires a recoil momentum $p_e = \sqrt{2\Delta E m_e}$, corresponding to a velocity $v_0 = p_e/m \approx 3.5$ m/s.

With a finite initial velocity, the mean squared position is:

$$\langle x^2(t) \rangle = v_0^2 t^2 + \frac{\hbar^2 k^2}{18m^2} t^3 \Gamma = v_{rec}^2 t^2 \left[ \left( \frac{v_0}{v_{rec}} \right)^2 + \frac{t\Gamma}{18} \right] \tag{3}$$

where $v_{rec} = \hbar k/m$ is the recoil velocity for the imaging wavelength, now 369 nm, and $\Gamma = 2\pi \times 19$ MHz. For the parameters above, $v_0/V_{rec} \approx 550$.

Recognizing that the number of scattered photons is $N_{ph} = t\Gamma/2$, it is clear that the first term dominates for $N_{ph} < 10^6$. Therefore, the position can be expressed as:

$$\sqrt{\langle x^2(t) \rangle} = \frac{2v_0 N_{ph}}{\Gamma} \approx 54 \text{ nm/photon} \tag{4}$$

With a total detection efficiency of $\eta = 0.1$, an average of 5 photons can be detected while maintaining $\sqrt{\langle x^2(t) \rangle} < 2.5$ $\mu$m, corresponding to 99% detection fidelity in the absence of dark counts. The necessary imaging time is less than 2 $\mu$s.

Achieving this collection and detection efficiency is challenging but achievable, for example, with a detector with 30% quantum efficiency and NA=0.7 objectives from two sides. However, this is a pessimistic estimate of the requirements for several reasons. First, $Yb^+$ ions are only produced on atoms undergoing a two-qubit gate, and these gates cannot be performed on every atom in the array in parallel because of cross-blockade effects. Therefore, it is only necessary to resolve the atoms participating in gates in a particular cycle, which may have a separation of 2a or 3a, allowing for longer imaging times and more particle spread. Second, it is assumed that the recoil momentum is always in the plane of the array. However, it is actually distributed in three dimensions, and out-of-plane motion does not matter on the relevant time scale. Lastly, all autoionization events are treated as transitions to $Yb^+$ (6s), while in reality, a significant fraction of autoionization events will decay to a $Yb^+$ (5d) state. These states can be quickly repumped to 6s, so imaging can proceed as normal. However, for this decay process, $\Delta E$ is smaller by a factor of approximately 6, and $v_0$ is smaller by a factor of 2.6.

We can also consider the role of a background electric field, which will cause a position displacement:

$$\Delta x = \frac{qE}{2m}t^2 = \frac{qE}{2m}\left(\frac{2N_{ph}}{\Gamma}\right)^2 \tag{5}$$

Here, E is the field strength and q is the electron charge. Using the $Yb^+$ ion parameters and $N_{ph}$=200, this results in a drift of approximately 316 nm/(mV/cm) during the imaging time. With intra-vacuum electrodes, it is possible to null background electric fields to below 1 mV/cm, so this is not a significant source of imaging error.

Lastly, consider electric fields resulting from the simultaneous creation of multiple $Yb^+$ ions in a single gate cycle. An ion at a distance of d=30 μm produces an electric field of 16 mV/cm, which will cause a displacement on both ions of approximately 5 μm during the time it takes to scatter 200 photons. Therefore, ion creation in a smaller radius will likely accelerate the ions too much to resolve their positions. This may motivate further reduction of the number of gates applied per cycle in the array.

Alternate Detection Strategies for Population in Rydberg States

Fluorescence detection of ions has the benefit of being fast and compatible with existing experimental techniques. One alternate approach is to detect $Yb^+$ ions and electrons using charged particle optics and detectors. A second alternative is to simply wait for any Rydberg atoms to decay. To ensure more than 99.9% of the ions have decayed, it would be necessary to wait approximately $\tau > 7/\Gamma \approx 1$ ms, and avoiding atom loss during this time will require that all of the intermediate Rydberg states are trapped. However, this is straightforward in alkaline earth atoms using the polarizability of the ion core. Because of the large number of intermediate Rydberg states and their complex radiative decay pathways, it is not possible to accurately calculate the ultimate branching ratio back into $^3P_0$, but a crude estimate suggests it would result in less efficient erasure conversion, with $R_e \approx 0.9$.

Gate Simulations

Figures 10A, 10B, 10C:
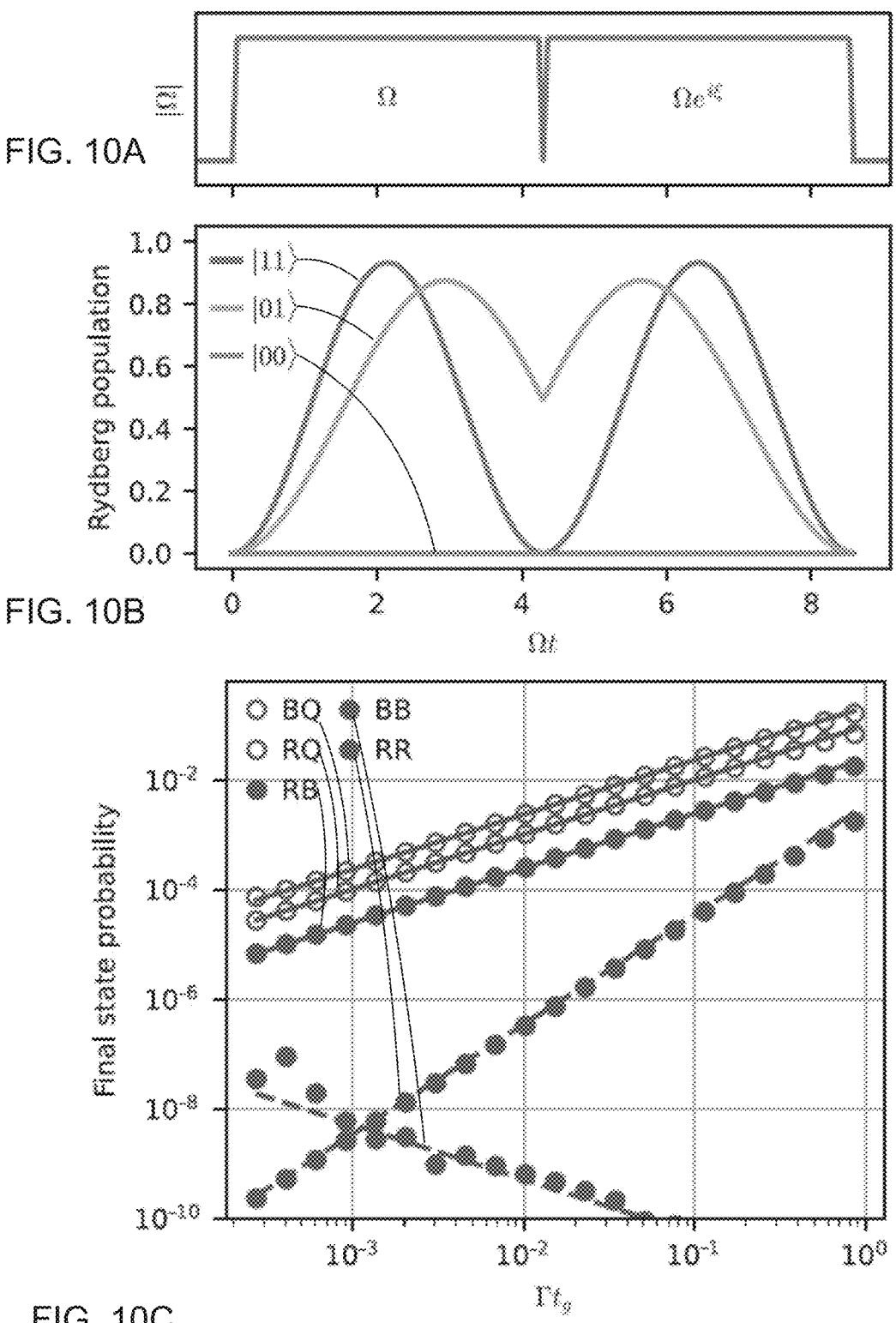
FIGS. 10A-10C graphically depict the operation of a controlled-Z gate on two qubits, including the decomposition of final states of the qubits in disjoint subspaces that can be detected.

FIGS. 10A-10C graphically depict gate simulation results. Specifically, FIG. 10A graphically depicts a pulse sequence used to implement a CZ gate. FIG. 10B graphically depicts Rydberg state population during the gate, for various initial states (figure marked to indicate colors). FIG. 10C graphically depicts final state probability of individual erasure error channels (see above discussion with respect to FIG. 6A) (figure marked to indicate colors). The solid lines are analytic estimates as previously discussed.

This section describes a detailed, microscopic simulation of a two-qubit gate using the level structure in FIG. 2, to evaluate the quantitative performance of the erasure conversion approach. While expecting that this protocol works for any Rydberg gate, the focus is specifically on a geometric phase gate consisting of two rectangular laser pulses addressing both atoms whose duration, detuning and relative phase are chosen to implement a controlled-Z gate up to single qubit phases, hereafter referred to as the symmetric CZ gate. The system is described by the following two-atom Hamiltonian:

$$H = \sum_{i=\{1,2\}} \frac{1}{2}(\Omega|r\rangle_{ii}\langle 1| + \Omega^*|1\rangle_{ii}\langle r|) + \Delta|r\rangle_{ii}\langle r| + V_{rr}|rr\rangle\langle rr| + \tag{6}$$

$$V_{pp}|pp\rangle\langle pp| + V_{rp}(|rp\rangle\langle pr| + |pr\rangle\langle rp|)$$

The qubit state 1 in each atom is coupled to r by a drive $\Omega$ with detuning $\Delta$. The Rydberg blockade shifts the state $|rr\rangle$ by $V_{rr}$. The inventors also incorporate a single additional state, $|p\rangle$, that is populated by BBR transitions. This state has a a self-blockade interaction with strength $V_{pp}$, and a cross-blockade interaction with $|r\rangle$ with strength $V_{rp}$. Only states with large matrix elements to $|r\rangle$ are populated by BBR transitions, and therefore, $V_{rp}$ is dominated by the strong dipole-dipole interaction. Therefore, it is expected that $V_{rp} >> V_{pp}$, $V_{rr}$.

The symmetric CZ gate protocol is based on the fact that, when $V_{rr} >> \Omega$, the initial state $|11\rangle$ cannot be excited to $|rr\rangle$, but is instead excited to $|W\rangle = (|1r\rangle + |r1\rangle)/\sqrt{2}$ at a rate $\sqrt{2}\Omega$. Therefore, the use of an appropriate detuned pulse with a phase slip allows for excitation trajectories for all initial states that return to themselves, but with different accumulated phases for $|11\rangle$ and $|01\rangle$ (or $|10\rangle$), giving rise to a controlled-Z (CZ) gate (FIGS. 10A-10B).

As discussed in the main text, the dominant, fundamental source of error is decay from $|r\rangle$ during the gate. This can result in a BBR transition to another Rydberg state, a radiative decay to the ground state $^1S_0$ ($|g\rangle$) or the computational level. During the erasure detection step, these correspond to three distinct outcomes: ion fluorescence (abbreviated as B), ground state fluorescence (R) or no signal, indicating that the qubit remains in the computational space (Q). In a two-qubit gate, the outcome QQ signals no erasure, while any other outcome is considered to be an erasure error on both qubits.

Analytic Error Model

This section derives analytic expressions for the probabilities of various errors to occur during the two-qubit gate. For atoms beginning in the state $|00\rangle$, there is no excitation to the Rydberg state, and therefore no errors. Below is considered the other initial states.

Initial State $|01\rangle$ (or $|10\rangle$)

First, consider the case that the atoms start in $|01\rangle$. The case $|10\rangle$ is identical because the gate is symmetric in the two atoms. During the gate, in the absence of errors, the state of the atoms can be represented as:

$$\psi(t) = \psi_1(t)|01\rangle + \psi_r(t)|0r\rangle \tag{7}$$

The Rydberg excitation probability $|\psi_r(t)|^2$ is plotted in FIG. 10B. The probability of a blackbody decay that leaves the qubits in the configuration QB (FIG. 11A) is given by the decay rate $\Gamma_B$ and the average population in the Rydberg state during the gate, $\alpha$:

$$\Gamma_B \alpha t_g = \Gamma_B \int_0^{t_g} |\psi_r(t)|^2 dt \tag{8}$$

Similarly, the probability of a radiative decay to QR is $\Gamma_R \alpha t_g$. For the symmetric CZ gate, $\alpha \approx 0.532$. The probability of the qubit decaying back to the computational space is $\Gamma_Q \alpha t_g$. Two simplifying assumptions about this process may be made. First, set the decay probability to $|00\rangle$ and $|01\rangle$ to be equal, though in reality they are biased towards $|01\rangle$, which is more favorable. Second, assume that the time spent in intermediate states is negligible compared to $t_g$, which is well-justified if $t_g > 100$ ns. After decaying to $|00\rangle$, the qubits will remain there for the rest of the gate. Decays to $|01\rangle$, however, result in re-excitation, resulting in $|0r\rangle$ population at the end of the gate, which is detected as a QB configuration. Denoting the fraction of decays to $|01\rangle$ that are re-excited as $R_{01}$, which may be computed as a weighted average over the possible decay times:

$$R_{01} = \frac{1}{t_g \alpha} \int_0^{t_g} |\psi_r(t)|^2 |\psi_r(t_g - t)|^2 dt \approx 0.700 \tag{9}$$

Here, $|\psi_r(t_g-t)|^2$ is the probability for an atom that has decayed at a time t to be found in $|r\rangle$ at the end of the gate. To see why this is the case, consider the directly computed re-excitation probability: $|\langle r|U(t, t_g)|1\rangle|^2$, where $U(t, t_g)$ is the propagator from time t to $t_g$. Taking the complex conjugate inside the square modulus allows this to be rewritten as $|\langle r|U(t_g, t)|1\rangle|^2$, describing the evolution of 1 backwards in time, from $t_g$ to t. Because the square modulus of the wavefunctions are clearly symmetric around the middle of the gate (FIG. 10B), this can be replaced by $|\langle r|U(0, t_g-t)|1\rangle|^2 = |\psi_r(t_g-t)|^2$.

Combining these results to arrive at the probability to end up in each subspace, having started in $|01\rangle$:

$$P(QR|01) = \Gamma_R \alpha t_g \tag{10}$$

$$P(QB|01) = \Gamma_B \alpha t_g + (\Gamma_Q/2) \alpha t_g R_{01} \tag{11}$$

$$P(QQ|01) = 1 - P(QR|01) - P(QB|01) \tag{12}$$

Figure 11A:
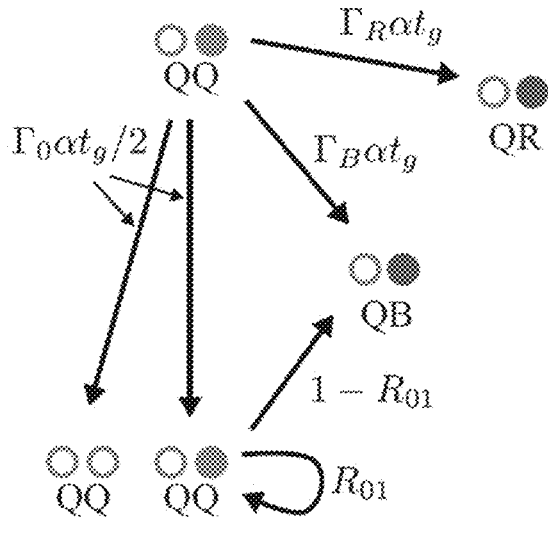
FIGS. 11A-11B graphically diagram transition probabilities during a two-qubit gate, for atoms beginning in the states $|10\rangle$ and $|11\rangle$, respectively.
Figure 11B:
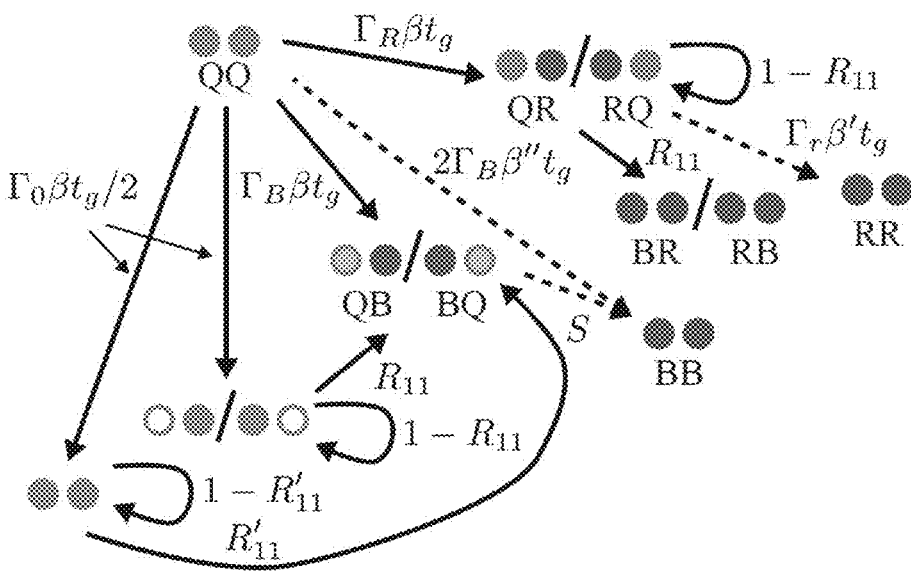

FIGS. 11A-11B graphically diagram transition probabilities during a two-qubit gate, for atoms beginning in $|10\rangle$ $|11\rangle$, respectively (numerical values of Table 1).

Initial State $|11\rangle$

Now is considered the case that the qubits start in $|11\rangle$ (FIG. 11B). During the gate, with no errors, the state can be represented as:

$$\psi(t) = \psi_{11}(t)|11\rangle + \psi_W(t)|W\rangle + \psi_{rr}(t)|rr\rangle \tag{13}$$

Where $|W\rangle = (|1r\rangle + |r1\rangle)/\sqrt{2}$. The inventors assume $|\psi_{rr}(t)|^2 \ll 1$ because of the Rydberg blockade, and neglect this component unless otherwise stated. The Rydberg excitation probability $|\psi w(t)|^2$ is plotted in FIG. 10B.

Proceeding as before, the probability of a blackbody decay to the subspace QB∪BQ depends on the average Rydberg population $\beta$:

$$\Gamma_B \beta t_g = \Gamma_B \int_0^{t_g} |\psi_W(t)|^2 dt \tag{14}$$

Similarly, the probability of a radiative decay to QR∪RQ is $\Gamma_R \beta t_g$. For the symmetric CZ gate, $\beta \approx 0.467$.

The qubits can also decay to back to the computational space QQ, with a total probability $\Gamma_Q \beta t_g$, and assuming that decays to $|01\rangle$ and $|11\rangle$ happen instantly with equal probability, as discussed in the preceding section. If the decay is to $|11\rangle$, then re-excitation can result in the configuration QB∪BQ at the end of the gate, with probability $R'_{11}$:

$$R'_{11} = \frac{1}{t_g \beta} \int_0^{t_g} |\psi_W(t)|^2 |\psi_W(t_g - t)|^2 dt \approx 0.700 \tag{15}$$

If the decay is to $|01\rangle$, then re-excitation is also possible but with a different probability $R'_{11}$, given by the single-atom excitation trajectory $\psi_r$:

$$R_{11} = \frac{1}{t_g \beta} \int_0^{t_g} |\psi_W(t)|^2 |\psi_r(t_g - t)|^2 dt \approx 0.640 \tag{16}$$

It is also possible that both atoms leave Q, resulting in the configurations BR∪RB, RR or BB. The configuration BR∪RB can be populated by an initial radiative decay to QR∪RQ, followed by re-excitation of the qubit remaining in Q (which is always in $|1\rangle$). The probability for this to occur is also $R_{11}$.

The configuration RR can be populated by a second radiative decay after an initial decay to QR∪RQ. The probability for this to occur, conditioned on the first radiative decay, is given by $\Gamma_R \beta' t_g$, where $\beta'$ is the average Rydberg population after the first decay:

$$\beta' = \frac{1}{t_g \beta} \int_0^{t_g} dt |\psi_W(t)|^2 \frac{1}{t_g} \int_t^{t_g} dt' |\psi_r(t_g - t)|^2 \tag{17}$$

$$\approx 0.266$$

Lastly, the configuration BB can be populated in two ways: by re-excitation after an initial blackbody decay to QB∪BQ, or decay from the doubly excited state $|rr\rangle$. The former is strongly suppressed by the blockade term $V_{rp}$ (in Eq. 6), while the latter is strongly suppressed by the blockade $V_{rr}$. The direct decay from $|rr\rangle$ occurs with probability:

$$2\Gamma_B \beta'' t_g = 2\Gamma_B \int_0^{t_g} |\psi_{rr}(t)|^2 dt \tag{18}$$

with the average $|rr\rangle$ population $$\beta'' \approx \beta \Omega^2 / (2V_{rr}^2).$$

Note that only a single decay is required, as the state $|rp\rangle$ results in the creation of two ions.

The probability for a pair of atoms that has already decayed to $QB \cup BQ$ to be re-excited is:

$$S = \frac{1}{t_g \beta} \int_0^{t_g} |\psi_W(t)|^2 |\psi_{rp}(t_g - t)|^2 dt \qquad (19)$$

Here, $$|\psi_{rp}(t)|^2 \approx \Omega^2/(2V_{rp}^2)$$

is the probability for the state $|1p\rangle$ to evolve into $|rp\rangle$ after a time t.

TABLE 1

| Term | Value |
| --- | --- |
| $\alpha$ | 0.532 |
| $R_{01}$ | 0.700 |
| $\beta$ | 0.467 |
| $R_{11}$ | 0.640 |
| $R'_{11}$ | 0.700 |
| $\beta'$ | 0.266 |
| $\beta''$ | $\beta\Omega^2/(2V_{rr}^2)$ |
| $S$ | $\Omega^2/(2V_{rp}^2)$ |

Table 1 depicts coefficients of the transition rates in FIGS. 7A-7B, evaluated for the symmetric CZ gate described previously.

From these expressions, compute the probability to end up in different final states, starting in $|11\rangle$.

$$P(QR \cup RQ|11) = \Gamma_R \beta t_g (1 - R_{11}) \qquad (20)$$

$$P(QB \cup BQ|11) = \Gamma_B \beta t_g (1 - S) + \Gamma_Q \beta t_g (R_{11} + R'_{11})/2 \qquad (21)$$

$$P(RB \cup BR|11) = \Gamma_R \beta t_g R_{11} \qquad (22)$$

$$P(RR|11) = (\Gamma_R t_g)^2 \beta\beta' \qquad (23)$$

$$P(BB|11) = \Gamma_B \beta t_g S + 2\Gamma_B \beta'' t_g \qquad (24)$$

SUMMARY

We can combine the analytic estimates above in Eqs. (10)-(12) and Eqs. (20)-(24) to obtain a total probability of each error channel. Given an initial state with probability $\{P_{00}, P_{01}, P_{11}\}$ to be in $\{|00\rangle, |01\rangle$ or $|10\rangle, |11\rangle\}$, the probability of each error channel is:

$$P_{QR} = P_{01}\Gamma_R \alpha t_g + P_{11}\Gamma_R \beta t_g (1 - R_{11}) \qquad (25)$$

$$P_{QB} = P_{01}\Gamma_B \alpha t_g + P_{11}[\Gamma_B \beta t_g (1 - S) + \Gamma_Q \beta t_g (R_{11} + R'_{11})/2] \qquad (26)$$

$$P_{RB} = P_{11}\Gamma_R \beta t_g R_{11} \qquad (27)$$

$$P_{RR} = P_{11}(\Gamma_R t_g)^2 \beta\beta' \qquad (28)$$

$$P_{BB} = P_{11}[2\Gamma_B \beta'' t_g + \Gamma_B \beta t_g S] \qquad (29)$$

The total erasure probability $p_e$ is given by the sum of the first five terms. The probability of an undetectable leakage error is $p_f = P_{BB}$.

The first three errors scale as $t_g$; correspondingly, the probability of these events goes as $\Gamma t_g$, and are the dominant error mechanism for the gate. The fourth expression, $P_{RR}$, decreases as $(\Gamma t_g)^2$. The final error probability $P_{BB}$, scales as $\Gamma t_g \Omega^2/(2V^2) \approx \Gamma/(t^8 V^2)$ (here, V is the smaller of $V_{rr}$, $V_{rp}$, which is typically $V_{rr}$. While this error probability decreases with $\Gamma$, it increases as $t_g$ decreases, as the larger $\Omega$ begins to overpower the blockade. As noted in the main text, the error BB is special because it cannot be readily detected and results in atom loss. However, excitation of $|rr\rangle$ causes other, coherent errors in the gate as well. Therefore, maintaining high fidelity gate operation even in the absence of spontaneous decay requires $\Omega/V > 20$. Since $P_{BB}/P_{QB} \approx \Omega^2/(2V^2)$, it seems that the probability of BB events will generally be smaller than the probability of undetected QB events, given the detection fidelity discussed elsewhere herein in more detail.

A final source of error is the non-Hermitian no-jump evolution that arises under the monitoring realized by the erasure detection. Since erasure errors do not occur from the state $|00\rangle$, and are approximately equally likely from the remaining computational states, the absence of an erasure detection reveals that the atoms are more likely to be in $|00\rangle$. The impact on the average gate infidelity is approximately $(p_e/4)^2$, which is not a significant contribution when $p_e \ll 16$ $(1-R_e) \approx 0.32$.

Comparison to Numerical Simulations

For comparison, a master equation simulation of the full two-atom model was performed. The error probabilities are considered as a function of the gate duration, $t_g$, which depends on the Rabi frequency as $t_g \approx 8.586/\Omega$. The gate error depends primarily on the dimensionless quantity $\Gamma t_g$, but is also sensitive to the blockade strength (in the high-fidelity regime), which is expressed in dimensionless units as $V_{rr}/\Gamma$. For simplicity, set $V_{rp} = V_{rr}$, though in reality, $V_{rp}$ is larger because it is a first-order process.

For the n=75 $^3S_1$ state in $^{171}$Yb, assume a Rydberg lifetime $\tau = 1/\Gamma = 100$ $\mu$s, and $V = 2\pi \times 1.3$ GHZ, based on previous measurements in $^{174}$Yb, giving $V/\Gamma = 10^6$. The achievable value of $t_g$ depends on the details of the experimental setup and excitation laser. However, it is noted that $\Omega = 2\pi \times 5.5$ MHz has been demonstrated for this state (starting from $^3P_1$) with very modest laser power, which would yield $t_g \approx 250$ ns and $\Gamma t_g \approx 2 \times 10^{-3}$.

In FIG. 10C, the predictions of Eqs. (25)-(29) are shown along with a master equation simulation of the two-atom model. The numerical simulation and the analytic model are in excellent agreement.

Other Factors Limiting Gate Fidelity

In additional simulations, the inventors have also considered a six-level model including the other $m_F$ sublevels of the $^3S_1$ F=3/2 state, imperfect laser polarization, and the role of finite blockade strength. A large magnetic field serves to detune the transition from 0 to the $m_F = 1/2$ Rydberg state by $\Delta_z = g_J\mu_B B \gg \Omega$. However, a small light shift remains that contributes both a single-qubit and a two-qubit phase, but which can be corrected by adjusting the gate parameters $\Delta$, $\xi$. Imperfect polarization also generates a small light shift that can be similarly accommodated. The finite blockade modifies the qubit trajectories, but can also be incorporated as a correction.

After optimization of the gate parameters, it is found that a fidelity with the target CZ gate of $1\text{-}10^{-5}$ can be realized (in the absence of spontaneous emission) if $\Delta_z/\Omega > 30$ and $V/\Omega > 100$. Using the experimentally demonstrated $\Omega = 2\pi \times 5.5$ MHz and $\Gamma^{-1} = 100$ $\mu$s, the average gate fidelity (including spontaneous emission) is $\mathcal{F} \approx 0.999$ (FIGS. 1-4). Therefore, with B≥90 G and $V_{rr}$≥2π×550 MHz (corresponding to a tweezer spacing α<4.5 μm), the additional coherent errors can be suppressed below $10^{-5}$, which will not impact the conditional fidelity $\mathcal{F}_{\tilde{z}}$ in FIGS. 1-4. These parameter values are based on the measured g-factor and $C_6$ coefficient for the $^3S_1F=3/2$ Rydberg states: $g_F=1.9$ MHz/G and measured $C_6=5(3)$ THz $\mu m^6$, respectively. This gate performance matches or exceeds theoretically predicted gate fidelities in alkali atom qubits.

Erasure Conversion for Other Errors

While the disclosure has primarily focused on two-qubit gate errors, as they are dominant and most problematic, the metastable state qubit encoding in $^{171}$Yb also allows erasure conversion for other errors.

First, any spontaneous decay or photon scattering occurring on idle qubits in the $^3P_0$ level is an erasure error with very high probability. Spontaneous decay to $^1S_0$ is always detectable. Raman and Rayleigh scattering from the optical tweezer have a vanishing probability of creating Pauli errors in the qubit subspace as long as the tweezer detuning is large compared to the hyperfine splitting in other excited states. It can shorten the lifetime of the qubit level by Raman scattering to other $^3P_J$ states, but these decay or are repumped to $^1S_0$, and detected as erasures.

The same logic can be applied to single-qubit gates performed using Raman transitions via the $6s7s\ ^3S_1$ state or other low-lying states, as long as the detuning is large compared to the hyperfine splitting in that state. If single-qubit gates are performed through the Rydberg state, then the analysis is the same as that of the two-qubit gate.

Lastly, it is noted that a significant source of error in current neutral atom gates is technical noise, either from Doppler shifts or frequency and intensity fluctuations of the driving laser. While this source of error is not fundamental, it is a significant practical nuisance. Noise that is slow compared to the duration of a gate, which is often the case for Doppler shifts and intensity noise, can be cancelled using composite pulse sequences or other robust control techniques. Unfortunately, this typically results in a longer total gate duration, increasing the Rydberg decay probability. However, this trade-off may be more advantageous with erasure conversion.

Impact of Errors in Initialization, Measurement and Single-Qubit Gates

FIGS. 11A-11B graphically illustrate logical error performance with errors on ancilla qubit initialization and measurement probability $p_m=0$ (solid lines, filled circles) and $p_m=0.005$ (dashed lines, open circles).

In the simulations in FIGS. 7A-7B and FIGS. 8A-8C, assume that native operations to initialize and measure the ancillas in the Hadamard basis, and native CNOT and CZ gates, such that no single-qubit gates are required. The impact of single-qubit gate errors can be estimated by considering an alternative stabilizer measurement circuit with ancilla initialization and measurement in the Z basis, and only CZ gates. This requires the insertion of four H gates, which can each be associated with one of the four two-qubit gates. Therefore, a pessimistic assumption is to treat an error in the H as an error in the two-qubit gate, which would increase the two-qubit gate error probabilities to $$p_p + p_p^{(1)} \text{ and } p_e + p_e^{(1)},$$

where $$p_e^{(1)}/(p_p^{(1)} + p_e^{(1)}) = R_e^{(1)}$$

is the erasure fraction of the single qubit gate. If $$R_e^{(1)} = 0,$$

then $R_e$ is reduced by a factor $1/(1+p^{(1)}/p)$, which means that $R_e$ is not significantly affected if $p^{(1)}/p<1-R_e$. This is not an unreasonable assumption for $R_e=0.98$. However, as discussed above, it is also possible to extend erasure detection to single-qubit gates, which would further relax this requirement.

Figure 12A:
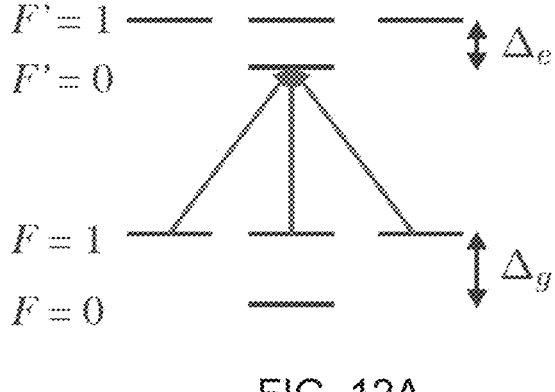
FIG. 12A graphically illustrates a typical driving scheme for hyperfine state readout on the $171Yb^+6s_{1/2} \rightarrow 6p_{1/2}$ transition.
Figure 12B:
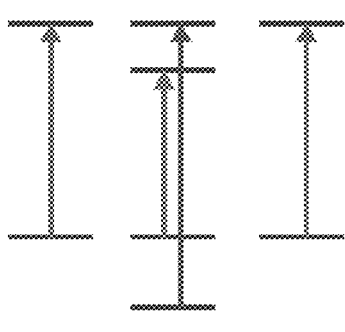
FIG. 12B graphically illustrates a three-frequency driving scheme that avoids dark states.

Additionally, consider the role of imperfect ancilla initialization and measurement. In the simulation, this is represented by inserting Pauli errors before or after perfect operations with probability $p_m$. Note that $p_m=0$ in FIGS. 7A-7B and FIGS. 8A-8C. Here is provided an attempt to quantify the impact of realistic initialization and measurement errors in two ways. First, consider a fixed value of $p_m$. For $p_m=0.001$, the threshold two-qubit gate error for $R_e=0.98$ is indistinguishable from its value when $p_m=0$. If $p_m=0.005$, it is found that the threshold is slightly reduced to $p_{th}=3.80\,(2)\,\%$, but the general behavior, even far below the threshold, is unchanged (FIG. 12A-12B). Second, study the case that the initialization and measurement errors have the same probability as two-qubit gate errors, $p_m=p$. In this case, it is found that the threshold decreases to 2.85(1)%.

Impact of Erasure Conversion on Operation Speed

This section considers how the operations required for erasure conversion may affect the overall computation speed of a neutral atom quantum computer. A single round of stabilizer measurements for a surface code with distance d requires of order $N=4d^2$ two-qubit gates, each of which takes a duration $t_g<1$ us. Gates that are sufficiently remote can be implemented in parallel, and it is estimated that in the limit of a large array, a fraction $f_p=1/10$ of the gates can be applied in each cycle. Therefore, the total time required to apply the gates is $t_g/f_p\approx10$ μs.

The erasure detection step must occur after each set of parallel gates, and takes a time $t_e\approx10$ μs (as discussed in section 3). This increases the cycle time to $(t_g+t_e)/f_p\approx100$ μs.

Atom replacement can be deferred until after the stabilizer measurement: once an erasure error has occurred, subsequent gates involving the error-affected atoms can simply be skipped. The time to move tweezers is $t_r$, and may be several hundred microseconds. All necessary replacements may be performed in parallel.

Lastly, the ancilla qubits need to be measured to extract the syndrome values, and the time for this operation is denoted as $t_m$. To enable the atoms to be re-used, this measurement should not result in the loss of atoms, which limits the scattering rate and results in $t_m\geq20$ ms.

Therefore, the total duration of a cycle is $(t_g+t_e)/f_p+t_r+t_m$. This is dominated by $t_m$, and therefore, the erasure conversion protocol will not significantly affect the total repetition time unless $t_m$ is reduced by about two orders of magnitude.

FIG. 12A graphically illustrates a typical driving scheme for hyperfine state readout on the $171$Yb$^+6s_{1/2}\rightarrow6p_{1/2}$ transition. It is noted that the F→−F−1 transition has two dark states (remixed by a magnetic field, not shown) that reduces the fluorescence by a factor of 1/3, to a maximum of Γ/6.

FIG. 12B graphically illustrates a three-frequency driving scheme that avoids dark states by achieving a saturated photon scattering rate of $\Gamma/2$.

Disclosed herein are various mechanisms providing efficient quantum error correction in neutral atoms by conversion to erasure errors. For example, one disclosed embodiment provides a process for implementing quantum error correction on a quantum computer using neutral atom arrays, comprising encoding a qubit into the energy levels of an atom that allows the vast majority of the errors to be detected passively, using atomic fluorescence on a cycling transition, instead of requiring syndrome measurement using ancilla qubits. This converts the majority of errors into erasure errors, for which it is known that error correction is much more effective. As a consequence, a quantum computer built with this approach can tolerate many more errors.

Advantageously, the disclosed approach increases the threshold error rate for quantum error correction. In turn, this enables a dramatic reduction in the logical error rate of quantum computers, or a reduction in the number of physical qubits needed to achieve the same logical error rate.

Erasure errors are easier to handle from an error correction perspective than some other types of errors. Therefore, a feature of various embodiments is encoding qubits into atoms in such a way that almost all errors become erasure errors. It is understood that the specific technique disclosed herein for accomplishing this with neutral atom qubits has never been considered before. More broadly, it is understood that there is no known approach about converting the dominant errors into erasure errors in any matter-based qubit platform. However, it is commonly discussed in the context of photonic qubits, where erasure errors are simply photon loss, and are already the dominant error mechanism.

Various embodiments such as discussed herein may be implemented in accordance with some or all of the following:

1. Qubits are encoded into the hyperfine sublevels of a metastable electronic level, such as the $F=1/2\,^3P_0$ level in $^{171}$Yb. This level is referred to as the computational space.

2. Gate operations are performed by optical coupling to an excited state. In the case of two-or multi-qubit gates, this state is a highly excited Rydberg state, such as the $F=3/2$ $6s75s\,^3S_1$ state in $^{171}$Yb. In the case of single-qubit gates, this is a low-lying excited state, such as the $6s7s\,^3S_1$ state in $^{171}$Yb.

3. During the gate, errors can occur because of spontaneous or stimulated transitions from the excited state. In the case of the Rydberg state, this includes radiative decay as well as transitions to nearby Rydberg states induced by blackbody radiation. Collectively, these events are referred to as scattering errors.

4. In some instances, scattering errors return the atom to the computational space, with the possibility of a bit flip or phase flip error having occurred. However, in other instances, scattering errors leave the atom in a separate, distinct energy manifold. In the case of photon scattering errors from $6s7s\,^3S_1$, the atom may transition to the true atomic ground state, $6s^2\,^1S_0$ with very high probability. The atom may also transition to the metastable state $6s6p\,^3P_2$, which can be repumped to $6s^2\,^1S_0$. In the case of radiative decays from the Rydberg state, the same levels may be populated. Additionally, blackbody radiation transitions may transfer the atom to opposite parity Rydberg states, for example, those with the electron configuration 6snp.

5. Scattering errors returning to the computational space must be detected using standard error syndrome measurements with ancilla qubits.

6. However, an important aspect of the disclosed approach is that scattering errors that result in transitions to $^1S_0$, or to other Rydberg states, can be directly detected without requiring error syndrome measurements with ancilla qubits. Detecting these errors converts them into erasure errors, which are defined as errors in known locations. This process is referred to herein as "erasure conversion".

7. Atoms that decay to $^1S_0$ can be detected using cycling fluorescence on the $1S_0$->$^1P_1$ transition (at 399 nm) or the $^1S_0$->$^3P_1$ transition (at 556 nm). Since the atoms in the computational states do not have any transitions at this wavelength, they will not be affected by this detection light. Therefore, it can be applied continuously to the array to immediately detect these errors on any atom. Detection of these errors is possible with a fidelity exceeding 99.9%.

8. Atoms in any Rydberg state can be detected by ionizing them using an autoionizing excitation on a core electron transition (i.e., the $6s$->$6p_{1/2}$ transition at 369 nm), and then detecting cycling fluorescence from the same transition in the $Yb^+$ ion. The resulting ions are not trapped, and have a small initial velocity of at most 3.5 m/s from recoil from the ejected electron. Nevertheless, with a suitably large numerical aperture imaging system (NA >0.5), they can be detected with a fidelity greater than 99% in several microseconds, which is sufficient to localize them to a single site in the array. Light at this wavelength does not disturb qubits in the computational state, and can be applied to detect errors on any qubit after a gate.

9. In principle, the creation of $Yb^+$ ions could also be measured directly, with an imaging ion detector and appropriate ion optics.

10. In principle, population in Rydberg states can also be detected without creating ions, but instead by waiting for the population to eventually radiatively decay. This requires that the Rydberg states are trapped, which has been demonstrated in Yb using the ion core transition (trapped arrays of alkaline earth Rydberg atoms in optical tweezers).

11. After detecting an erasure error, the error-affected atom(s) are replaced with new atoms from a reservoir using a movable optical tweezer. This may be performed immediately, or it may be deferred until a later time, such as after the current round of stabilizer measurements has finished.

12. After completing a round of syndrome measurements, the measured syndromes are used together with the detected location of erasure errors to infer the presence of a logical qubit error. Because any quantum code can correct approximately twice as many erasure errors as errors in unknown positions, this significantly improves the decoding performance.

13. An important parameter determining the performance improvement is the fraction of all scattering errors that are converted into erasure errors. In the case of $^{171}$Yb, with the qubit encoding discussed above, it is predicted that this fraction is over 95%.

14. This technique significantly increases the fault-tolerance error threshold, and also increases the number of errors that a code can tolerate, the error distance. In an example calculation with the planar XZZX surface code, a threshold of 0.937% with only computational errors has been calculated, which increases to over 4.15% if 98% of the errors are converted into erasures. A faster decrease of the logical error rate below the threshold has also been calculated, corresponding to a larger error distance.

15. In addition to detecting atoms that decay during the gate, this approach also allows atoms trapped in the Rydberg state at the end of the gate to be detected. This could arise from coherent errors in the gate (i.e., arising from intensity noise, laser frequency noise or doppler shifts) or from re-excitation of atoms that decayed earlier in the gate.

While the fraction of errors that can be converted into erasures is limited by a large set of low-probability decay pathways back to the computational space, by repumping some of these intermediate states, in particular the 6s5d $^3D_1$ state, it is possible that the fraction of decays to the computational states could be reduced further.

The performance of the erasure conversion was studied in the context of the XZZX surface code, because this code is very simple to analyze. However, it is expected that similar benefits should be obtained with other error correcting codes. It is a generic property of quantum error correcting codes that a code with distance d can correct (d−1)/2 generic errors, but d−1 erasure errors.

The disclosed approach provides a significant advantage for realizing fault-tolerant quantum computing. Compared to a standard qubit error model, erasure conversion allows fault-tolerant error correction with nearly 10 times higher physical error rate. For physical error rates small enough to realize fault-tolerance with conventional approaches, erasure conversion allows the same logical error rate to be achieved with significantly fewer qubits.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

While specific systems, apparatus, methodologies, mechanisms and the like have been disclosed as discussed above, it should be apparent to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In addition, the references listed herein are also part of the application and are incorporated by reference in their entirety as if fully set forth herein.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A system for quantum error correction, comprising:
a quantum system comprising an array of qubits;
an optical system configured to trap, manipulate, and/or detect the array of qubits using light;

a processor; and
a memory, including instructions stored thereon, which when executed by the processor, cause the quantum system to:
trap and/or manipulate the array of qubits by the optical system, wherein the array of qubits includes encoded neutral atoms or ions and forms a computational space;
encode each qubit in the array of qubits to a state characterized in that an error during at least one operation including idling, a gate, or other operation, results in a respective qubit transition to a disjointed state where that error can be detected without disturbing the qubits remaining in the computational space, wherein the array of qubits form a quantum error correcting code and the detected error comprises an erasure error;
perform a syndrome measurement of a quantum error correcting code;
identify a presence and location of an error by detecting that the corresponding neutral atom or ion has left the computational space after performing the at least one operation;
identify a logical error in the quantum error correcting code associated with a loss of qubit information based on the identified error location and results of the syndrome measurement; and
adjust subsequent computational steps based on the identified logical error.

2. The quantum system of claim 1, wherein adjusting subsequent computational steps includes at least one of fixing the error or rejecting the results of a portion of the computation and repeating the portion of the computation.

3. The quantum system of claim 1, wherein for the gate operation the instructions when executed by the processor further cause the quantum system to:
process the qubits in accordance with the gate operation, wherein the gate operation is performed by optical coupling of qubits to an excited state;
detect the error by detecting that the corresponding neutral atom or ion has left the computational space after performing the gate operation;
identify the location or a time of the detected error; and
replace or reinitialize an atom or an ion of a qubit associated with the detected error.

4. The quantum system of claim 1, wherein during idling or a gate operation, errors may be caused by Raman or Rayleigh scattering, or spontaneous decay, which results in a transition outside of the computational space.

5. The quantum system of claim 4, wherein the instructions when executed by the processor, further cause the quantum system to:
optically pump metastable states other than computational states to a ground state to facilitate detection while avoiding transitions into the computational space.

6. The quantum system of claim 5, where population in the ground states is detected using cycling fluorescence on a transition that does not disturb the computational space.

7. The quantum system of claim 3, wherein during a gate operation, wherein the excited state comprises a highly excited Rydberg state and errors may be caused by thermal photons via absorption or simulated emission while in the excited state, which results in a transition outside of the computational space.

8. The quantum system of claim 7, wherein the instructions when executed by the processor, further cause the quantum system to:

directly detect a population remaining in Rydberg states at an end of each gate operation without performing error syndrome measurements with ancilla qubits.

9. The quantum system of claim 7, wherein the detection is performed by:

optically pumping metastable states other than computational states to a ground state to facilitate detection while avoiding transitions into the computational space.

10. The quantum system of claim 9, wherein the detection is further performed by:

detecting atoms in trapped Rydberg states by waiting for the atoms to decay to the ground state and detecting cycling fluorescence from the ground state.

11. The quantum system of claim 7, wherein the detection is performed by:

detecting atoms remaining in Rydberg states by ionizing them using an autoionizing excitation on a core electron and then detecting cycling fluorescence from the same transition in the ion.

12. The quantum system of claim 7, wherein the detection is performed by:

detecting atoms remaining in Rydberg states by ionizing them using an autoionizing excitation and detecting ions directly with an ion detector and ion optics.

13. The quantum system of claim 1, wherein the instructions when executed by the processor, further cause the quantum system to:

encode a qubit in metastable electronic states, wherein a transition outside of those states are indicative of an error.

14. The quantum system of claim 13, wherein the qubits comprise 171-ytterbium atoms, and the encoding states comprise hyperfine states of a 6s6p $^3P_0$ F=1/2 level in $^{171}$Yb.

15. The system of claim 1, wherein transitions outside of the computational space are detected by measuring a $6s^2$ $^1S_0$ ground state population, using cycling fluorescence on the $6s^2$ $^1S_0$->$6s6p$ $^1P_1$ transition with a wavelength near 399 nm, which does not disturb atoms remaining in the computational space.

16. The quantum system of claim 7, wherein the highly excited Rydberg state comprises a state belonging to a 6sns $^3S_1$ F=3/2 Rydberg level with principal quantum number n substantially within a range of 40-100.

17. The quantum system of claim 7, wherein the highly excited Rydberg state includes Rydberg levels with a Rydberg electron having orbital angular momentum L=0, L=1 or L=2, and principal quantum number substantially within a range of 40-100, and a total angular momentum F=1/2, 3/2, or 5/2.

18. The system of claim 7, wherein a population remaining in Rydberg states at an end of the gate is converted into Yb$^+$ ions by driving a $6s_{1/2}$->$6p_{1/2}$ inner electron transition near 369 nm, resulting in autoionization.

19. The system of claim 7, wherein Yb$^+$ ions are detected using cycling fluorescence on the Yb$^+$ ion $6s_{1/2}$->$6p_{1/2}$ transition with a wavelength near 369 nm, which does not disturb ions remaining in the computational space.

20. The quantum system of claim 1, wherein the instructions when executed by the processor, further cause the quantum system to:

replace, using an optical tweezer, each neutral atom or ion that has left the computational space with a replacement neutral atom or ion having a predefined state.

21. A method for quantum error correction, comprising:

trapping and/or manipulating an array of qubits, wherein the array of qubits includes encoded neutral atoms or ions and forms a computational space;

encoding the array of qubits to a state characterized in that an error during at least one operation including idling, a gate, or other operation results in a respective qubit transition to a disjointed state where that error can be detected without disturbing the qubits remaining in the computational space, wherein the array of qubits form a quantum error correcting code and the detected error comprises an erasure error;

performing a syndrome measurement of a quantum error correcting code;

identifying the presence and location of an error by detecting the corresponding neutral atom or ion has left the computational space after performing the at least one operation;

identifying a logical error in the quantum error correcting code associated with a loss of qubit information based on the identified error location and results of the syndrome measurement; and adjusting subsequent computational steps based on the identified logical error.

22. A quantum system for quantum error correction, comprising:

an optical system configured to trap, manipulate, and/or detect an array of qubits using light;

a processor; and a memory, including instruction stored thereon, which when executed by the processor, cause the quantum system to:

trap and/or manipulate the array of qubits, wherein the array of qubits includes encoded neutral atoms or ions and forms a computational space;

encode the array of qubits to a state characterized in that an error during at least one of an idling, gate, or other operation results in a respective qubit transition to a disjointed state where that error can be detected without disturbing the qubits remaining in the computational space;

for each gate operation detect an erasure error and replace or reinitialize an atom or an ion of a qubit associated with the detected erasure error;

identify an error location within the quantum error correcting code based on the detected error;

identify a logical error in the quantum error correcting code associated with a loss of qubit information based on the identified error location; and adjust the subsequent computational steps to correct the error.

* * * * *